(12) United States Patent
Matsunobu

(10) Patent No.: US 10,313,637 B2
(45) Date of Patent: Jun. 4, 2019

(54) DIGITAL MICROSCOPE APPARATUS FOR REIMAGING BLURRY PORTION BASED ON EDGE DETECTION

(71) Applicant: Sony Corporation, Tokyo (JP)

(72) Inventor: Goh Matsunobu, Kanagawa (JP)

(73) Assignee: Sony Corporation, Tokyo (JP)

( * ) Notice: Subject to any disclaimer, the term of this patent is extended or adjusted under 35 U.S.C. 154(b) by 432 days.

(21) Appl. No.: 14/199,682

(22) Filed: Mar. 6, 2014

(65) Prior Publication Data

US 2014/0267675 A1    Sep. 18, 2014

(30) Foreign Application Priority Data

Mar. 13, 2013  (JP) ................. 2013-050520

(51) Int. Cl.

| H04N 7/18 | (2006.01) |
|---|---|
| G02B 7/34 | (2006.01) |
| G02B 7/36 | (2006.01) |
| G02B 21/00 | (2006.01) |
| G02B 21/14 | (2006.01) |
| G02B 21/18 | (2006.01) |
| G02B 21/24 | (2006.01) |
| G02B 21/36 | (2006.01) |

(52) U.S. Cl.
CPC ............. *H04N 7/183* (2013.01); *G02B 7/34* (2013.01); *G02B 7/36* (2013.01); *G02B 21/0016* (2013.01); *G02B 21/14* (2013.01); *G02B 21/18* (2013.01); *G02B 21/244* (2013.01); *G02B 21/245* (2013.01); *G02B 21/367* (2013.01)

(58) Field of Classification Search
None
See application file for complete search history.

(56) References Cited

U.S. PATENT DOCUMENTS

| 2004/0252875 | A1* | 12/2004 | Crandall | ............. G02B 21/002 382/133 |
|---|---|---|---|---|
| 2006/0034543 | A1* | 2/2006 | Bacus | ................. G02B 21/367 382/284 |
| 2008/0175508 | A1* | 7/2008 | Bando | ..................... G06T 5/003 382/255 |

(Continued)

FOREIGN PATENT DOCUMENTS

| JP | 2011-090222 A | 5/2011 |
|---|---|---|
| JP | 2011-197283 A | 10/2011 |

*Primary Examiner* — Jefferey F Harold
*Assistant Examiner* — Humam M Satti
(74) *Attorney, Agent, or Firm* — Chip Law Group

(57) ABSTRACT

A digital microscope apparatus includes: an observation image capturing unit configured to capture an observation image of each of a plurality of small areas, an area containing a sample on a glass slide being partitioned by the plurality of small areas; and a controller configured to set at least one evaluation area for the observation image of each of the plurality of small areas, the observation image being captured by the observation image capturing unit, to perform an edge detection on the at least one evaluation area, and to calculate, using results of the edge detection on two evaluation areas that are closest between two of the observation images adjacently located in a connected image, a difference in blur evaluation amount between the two observation images, the connected image being obtained by connecting the observation images according to the partition.

11 Claims, 16 Drawing Sheets

(56) References Cited

U.S. PATENT DOCUMENTS

| | | | | |
|---|---|---|---|---|
| 2009/0208098 | A1* | 8/2009 | Yang | G06T 1/60 |
| | | | | 382/164 |
| 2011/0249910 | A1* | 10/2011 | Henderson | G06K 9/00134 |
| | | | | 382/278 |
| 2012/0236120 | A1* | 9/2012 | Kramer | G02B 21/0004 |
| | | | | 348/46 |
| 2012/0307047 | A1* | 12/2012 | Kawashima | G06T 3/4038 |
| | | | | 348/135 |
| 2013/0250144 | A1* | 9/2013 | Takayama | H04N 5/265 |
| | | | | 348/239 |
| 2014/0252200 | A1* | 9/2014 | Garsha | G02B 21/367 |
| | | | | 250/201.3 |

* cited by examiner

DIGITAL MICROSCOPE APPARATUS FOR REIMAGING BLURRY PORTION BASED ON EDGE DETECTION

CROSS REFERENCE TO RELATED APPLICATIONS

This application claims the benefit of Japanese Priority Patent Application JP 2013-050520 filed Mar. 13, 2013, the entire contents of which are incorporated herein by reference.

BACKGROUND

The present disclosure relates to a digital microscope apparatus that captures an enlarged image of a sample such as a biological sample as an observation image, and to an imaging method for the digital microscope apparatus and a program.

In the past, in order to observe the whole of a sample with use of a digital microscope apparatus, images of small areas that partition an area containing the sample on a glass slide are captured by an enlarging imaging system and such images of the respective small areas are connected to one another to generate one large image.

For a focusing system in which an objective lens of the enlarging imaging system is focused on a pathological sample serving as an imaging target, autofocusing (AF) is adopted. For example, the following autofocusing is disclosed: a focal position of the objective lens in the enlarging imaging system is moved in an optical axis direction at predetermined intervals, images are captured at the respective moved positions, and a position at which an image having the highest contrast in the captured images is captured is detected as an in-focus position (see, for example, Japanese Patent Application Laid-open No. 2011-197283). This type of focusing system is called "contrast AF".

Although providing relatively high accuracy in focal point, the contrast AF performs repetitive movements and evaluations of the focal position of the objective lens in order to search for an optimal focal position. Consequently, it takes a relatively long time to obtain the focal position.

In this regard, a microscope apparatus that adopts a "phase difference AF" in which light taken through an objective lens is split into two light beams by a splitter lens and the position and direction of a focal point is determined based on a distance between two formed images is also disclosed (see, for example, Japanese Patent Application Laid-open No. 2011-090222). The phase difference AF can provide a focal position at higher speed than the contrast AF without the search for a focal position. Conversely, there is a possibility that the accuracy is lowered due to the size of an object within the imaging surface or due to the number of tissues.

SUMMARY

In the digital microscope apparatus, images of a lot of samples have been requested to be acquired with high quality and at high speed as much as possible, but the request is not met sufficiently.

In view of the circumstances as described above, it is desirable to provide a digital microscope apparatus, an imaging method therefor, and a program that are capable of acquiring images of a lot of samples with high quality and at high speed as much as possible.

According to an embodiment of the present disclosure, there is provided a digital microscope apparatus including: an observation image capturing unit configured to capture an observation image of each of a plurality of small areas, an area containing a sample on a glass slide being partitioned by the plurality of small areas; and a controller configured to set at least one evaluation area for the observation image of each of the plurality of small areas, the observation image being captured by the observation image capturing unit, to perform an edge detection on the at least one evaluation area, and to calculate, using results of the edge detection on two evaluation areas that are closest between two of the observation images adjacently located in a connected image, a difference in blur evaluation amount between the two observation images, the connected image being obtained by connecting the observation images according to the partition.

The controller may be configured to determine, as a blurred boundary part, a boundary part located between the observation images and having a difference in blur evaluation amount that is out of a predetermined allowable range.

The controller may be configured to determine, based on a result of the determination of the blurred boundary part, a small area to be reimaged by the observation image capturing unit and a condition of the reimaging for the small area to be reimaged.

More specifically, the controller may be configured to determine the small area surrounded by the blurred boundary parts as the small area to be reimaged, and to determine to switch an autofocusing method, for the condition of the reimaging.

This allows an observation image to be obtained by a more appropriate autofocusing method in accordance with the state of the sample.

The controller may be configured to determine, when determining that the blurred boundary parts exist in n small areas successively located in a predetermined one axial direction (where n is an integer of 3 or more), the n small areas as small areas to be reimaged, to change an imaging range in the one axial direction of the observation image capturing unit into 1/m of the imaging range at a first imaging (where m is an integer of 2 or more), for the condition of the reimaging, and to determine to divide each of the small areas into m areas for reimaging.

This also allows a good observation image of the sample to be obtained from, for example, a preparation in which the sample is sealed in at a large inclination angle with respect to a glass slide surface.

Further, the digital microscope apparatus according to the embodiment of the present disclosure may further include a thumbnail image capturing unit configured to capture an entire image of the sample on the glass slide, in which the controller may be configured to generate, when the blurred boundary part is determined again in the connected image containing the observation image of the small area that is reimaged by the observation image capturing unit, an image that clearly specifies a position of the blurred boundary part in a thumbnail image captured by the thumbnail image capturing unit and to display the image on a display.

This allows a user to, for example, visually recognize the blurred boundary part on the preparation while checking the position of the blurred boundary part in the connected image, and if dirt and the like are mixed in the preparation, to manually adjust a focal position to perform reimaging, for example.

According to another embodiment of the present disclosure, there is provided an imaging method for a digital microscope apparatus, the imaging method including: setting at least one evaluation area for an observation image of each of a plurality of small areas, the observation image being captured by an observation image capturing unit configured to capture an observation image of each of the plurality of small areas, an area containing a sample on a glass slide being partitioned by the plurality of small areas; performing an edge detection on the at least one evaluation area; and calculating, using results of the edge detection on two evaluation areas that are closest between two of the observation images adjacently located in a connected image, a difference in blur evaluation amount between the two observation images, the connected image being obtained by connecting the plurality of observation images according to the partition.

According to another embodiment of the present disclosure, there is provided a program causing a computer to operate as a controller configured to set at least one evaluation area for an observation image of each of a plurality of small areas, the observation image being captured by an observation image capturing unit configured to capture an observation image of each of the plurality of small areas, an area containing a sample on a glass slide being partitioned by the plurality of small areas; to perform an edge detection on the at least one evaluation area; and to calculate, using results of the edge detection on two evaluation areas that are closest between two of the observation images adjacently located in a connected image, a difference in blur evaluation amount between the two observation images, the connected image being obtained by connecting the plurality of observation images according to the partition.

As described above, according to the present disclosure, it is possible to acquire images of a lot of samples with high quality and at high speed as much as possible.

These and other objects, features and advantages of the present disclosure will become more apparent in light of the following detailed description of best mode embodiments thereof, as illustrated in the accompanying drawings.

DETAILED DESCRIPTION OF EMBODIMENTS

Hereinafter, embodiments of the present disclosure will be described with reference to the drawings.

First Embodiment

Figure 1:
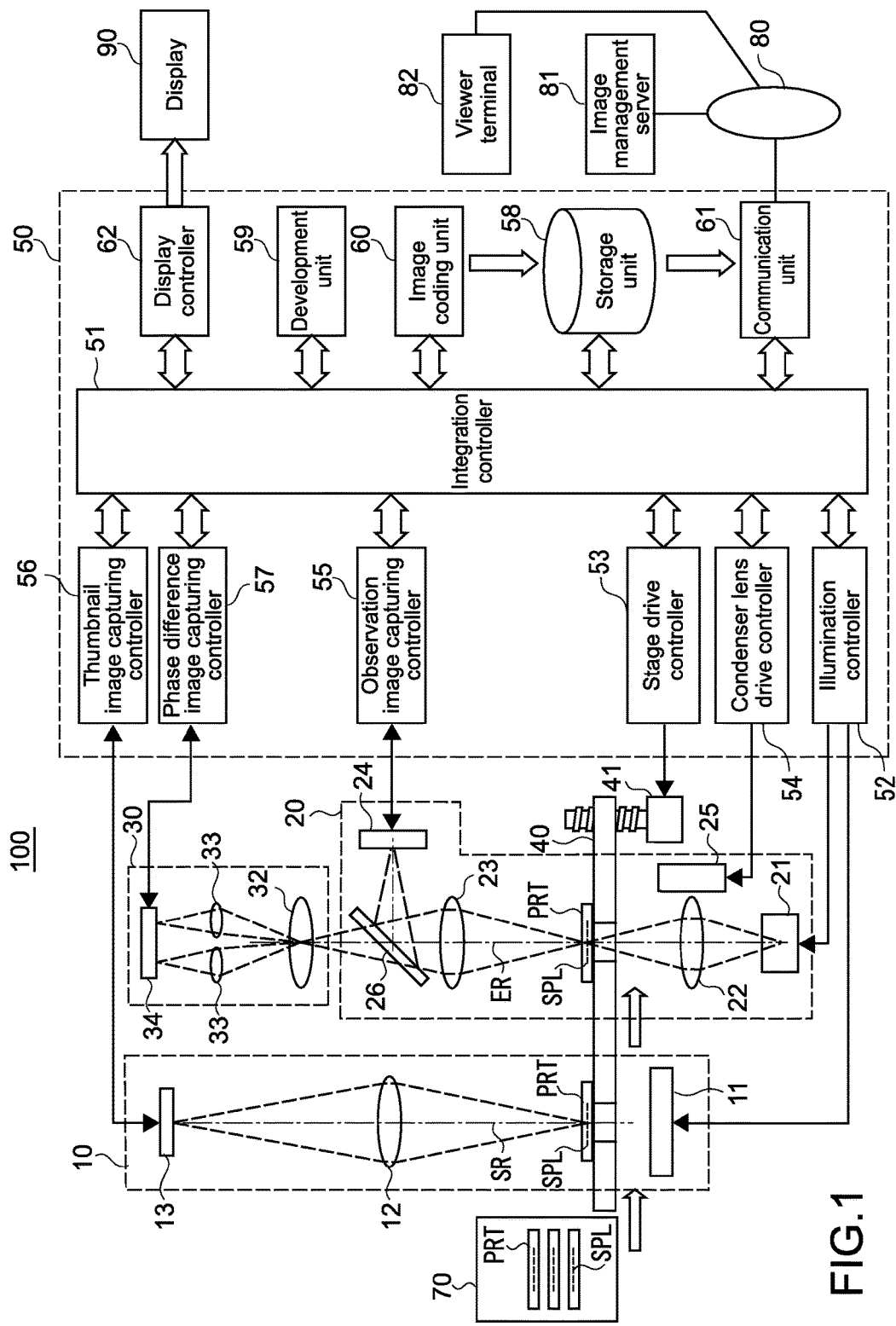
FIG. 1 is a diagram showing a whole configuration of a digital microscope apparatus according to an embodiment.

FIG. 1 is a diagram showing a whole configuration of a digital microscope apparatus 100 according to this embodiment.

(Whole Configuration)

The digital microscope apparatus 100 includes a thumbnail image capturing unit 10, an observation image capturing unit 20, a phase difference image acquiring unit 30, a stage 40, and a controller 50.

The thumbnail image capturing unit 10 captures an entire image of a preparation PRT on which a sample SPL is provided (this image being hereinafter referred to as a "thumbnail image").

The observation image capturing unit 20 captures an image obtained by magnifying the sample SPL provided on the preparation PRT at a predetermined magnification (the image being hereinafter referred to as an "observation image").

The phase difference image acquiring unit 30 captures a phase difference image containing information on the amount and orientation of a displacement in an optical axis direction between a focal point of an objective lens 23 of the observation image capturing unit 20 and the sample SPL on the preparation PRT.

The stage 40 moves the preparation PRT placed thereon to a position for imaging by the thumbnail image capturing unit 10 and a position for imaging by the observation image capturing unit 20. The stage 40 is configured to be movable by a stage drive mechanism 41 in a direction of an optical axis (z-axis direction) of the objective lens 23 of the observation image capturing unit 20 and also in a direction (x-axis direction and y-axis direction) orthogonal to the direction of the optical axis. Additionally, the stage 40 is desirably movable also in a direction inclining with respect to a plane orthogonal to the direction of the optical axis. Furthermore, for the movement in the optical axis direction, a configuration in which the objective lens 23 is moved vertically by using, for example, a piezo-stage may be provided.

It should be noted that the preparation PRT is obtained by fixing the sample SPL to a glass slide by a predetermined fixing method. The sample SPL is a biological sample that includes tissue slices of connective tissues such as blood, epithelial tissues, and tissues including both of the above tissues, or the like or includes smear cells. The tissue slices or smear cells are subjected to various types of staining as necessary. Examples of staining include not only general staining represented by HE (hematoxylin-eosin) staining, Giemsa staining, Papanicolaou staining, Ziehl-Neelsen staining, and Gram staining but also fluorescent staining such as FISH (Fluorescence In-Situ Hybridization) and an enzyme antibody technique.

The digital microscope apparatus 100 is additionally equipped with a preparation stock loader 70 that stores the preparations PRT each containing the sample SPL and loads the stored preparations PRT one by one onto the stage 40. It should be noted that the preparation stock loader 70 may be integrated into the digital microscope apparatus 100.

Next, the details of the thumbnail image capturing unit 10, observation image capturing unit 20, phase difference image acquiring unit 30, and controller 50 described above will be described.

(Thumbnail Image Capturing Unit 10)

The thumbnail image capturing unit 10 includes a light source 11, an objective lens 12, and an imaging device 13 as shown in FIG. 1.

The light source 11 is provided on a surface of the stage 40, which is on the opposite side to the surface on which the preparation is arranged. The light source 11 can switch between light (bright field illumination light) for illuminating a sample SPL on which general staining is performed and light (dark field illumination light) for illuminating a sample SPL on which special staining is performed. Further, the light source 11 may apply only one of the bright field illumination light and the dark field illumination light. In this case, two types of light sources, i.e., the light source that applies the bright field illumination light and the light source that applies the dark field illumination light, are provided as the light sources 11. It should be noted that the light source that applies the dark field illumination light may be provided on the surface side of the stage 40 on which the preparation is arranged (hereinafter, the surface being also referred to as preparation arrangement surface).

The objective lens 12 is arranged on the preparation arrangement surface side of the stage 40, with the normal line of a reference position of the thumbnail image capturing unit 10 on the preparation arrangement surface being as an optical axis SR. Transmitted light that has been transmitted through the preparation PRT arranged on the stage 40 is collected by the objective lens 12 and forms an image onto the imaging device 13 that is provided behind the objective lens 12 (that is, in a traveling direction of the illumination light).

Further, it may be possible to provide not the above-mentioned finite conjugate arrangement but an infinite conjugate arrangement and to provide a configuration in which an imaging lens is arranged behind the objective lens 12 and an image is formed onto the imaging device 13.

Light covering an imaging range in which the entire preparation PRT placed on the preparation arrangement surface of the stage 40 is included is focused onto the imaging device 13 to form an image. The image formed onto the imaging device 13 is a thumbnail image of the entire preparation PRT.

(Observation Image Capturing Unit 20)

As shown in FIG. 1, the observation image capturing unit 20 includes a light source 21, a condenser lens 22, the objective lens 23, an imaging device 24, a condenser lens drive mechanism 25, and a beam splitter 26.

The light source 21 applies the bright field illumination light. The light source 21 is provided on the surface of the stage 40, which is on the opposite side to the preparation arrangement surface. Further, at a position different from the light source 21 (for example, on the preparation arrangement surface side), a light source (not shown) that applies the dark field illumination light is provided.

The condenser lens 22 is a lens that collects the bright field illumination light applied from the light source 21 or dark field illumination light applied from a dark field illumination light source to guide the light to the preparation PRT on the stage 40. The condenser lens 22 is arranged between the light source 21 and the stage 40, with the normal line of a reference position of the observation image capturing unit 20 on the preparation arrangement surface being as an optical axis ER.

The condenser lens drive mechanism 25 changes the position of the condenser lens 22 on the optical axis ER by driving the condenser lens 22 along a direction of the optical axis ER.

The objective lens 23 is arranged on the preparation arrangement surface side of the stage 40, with the normal line of the reference position of the observation image capturing unit 20 on the preparation arrangement surface being as the optical axis ER. In the observation image capturing unit 20, the objective lens 23 is appropriately replaced, so that the image of the sample SPL can be enlarged and captured at various magnifications. Further, in the case where an imaging lens is arranged in the infinite conjugate system, a magnification can be changed by appropriately replacing the imaging lens. Transmitted light that has been transmitted through the preparation PRT arranged on the stage 40 is collected by the objective lens 23 and reaches the beam splitter 26.

The beam splitter 26 splits the transmitted light that has been transmitted through the objective lens 23 into reflected light that proceeds to the imaging device 24 and transmitted light that proceeds to a field lens 32 in the phase difference image acquiring unit 30.

On the imaging device 24, an image of a small imaging range on the preparation arrangement surface of the stage 40 is formed in accordance with a pixel size of the imaging device 24 and a magnification of the objective lens 23.

(Phase Difference Image Acquiring Unit 30)

As shown in FIG. 1, the phase difference image acquiring unit 30 includes the field lens 32, a separator lens 33, and an imaging device 34.

The field lens 32 collects the reflected light that has been transmitted through the beam splitter 26 and guides the reflected light to the separator lens 33 that is provided behind the field lens 32 (on a traveling direction side of the reflected light).

The separator lens 33 divides the light beam guided from the field lens 32 into two light beams. The divided light beams form a set of subject images on an imaging surface of the imaging device 34 provided behind the separator lens 33 (on the traveling direction side of the reflected light).

On the imaging device 34, a set of subject images that has been transmitted through the separator lens 33 is formed. A phase difference exists between the set of formed subject images because light beams in various directions, which are emitted from the field lens 32, enter the separator lens 33. In the following description, the set of subject images is referred to as a "phase difference image".

It should be noted that the beam splitter 26 is provided between the objective lens 23 and the imaging device 24 in the above description, but a light beam branching unit that branches a light beam is not limited to the beam splitter. A movable mirror and the like may be used as the beam splitter.

Additionally, in the above description, the phase difference image acquiring unit 30 is arranged on the optical axis ER of the objective lens 23, and the imaging device 24 of the observation image capturing unit 20 is arranged at a position on which the reflected light split by the beam splitter 26 is incident. Conversely, the imaging device 24 of the observation image capturing unit 20 may be arranged on the optical axis ER of the objective lens 23 and the phase difference image acquiring unit 30 may be arranged at a position on which the reflected light split by the beam splitter 26 is incident.

Further, in the above-mentioned description, the configuration in which the field lens, the separator lens, and the imaging device are provided is shown as a phase difference AF optical system in the phase difference image acquiring unit 30, but the present disclosure is not limited to such an example. Such a phase difference AF optical system may be a different optical system in which equivalent functions can be achieved by using a condenser lens and twin lenses instead of the field lens, the separator lens, and the like.

Furthermore, each of the imaging devices provided to the thumbnail image capturing unit 10, the observation image capturing unit 20, and the phase difference image acquiring unit 30 may be a one-dimensional imaging device (line sensor) or a two-dimensional imaging device (area sensor).

(Controller 50)

The controller 50 includes an integration controller 51, an illumination controller 52, a stage drive controller 53, a condenser lens drive controller 54, a phase difference image capturing controller 57, a thumbnail image capturing controller 56, an observation image capturing controller 55, a storage unit 58, a development unit 59, an image coding unit 60, a communication unit 61, and a display controller 62.

The integration controller 51 is constituted of hardware elements of a computer including, for example, a CPU (Central Processing Unit), a ROM (Read Only Memory), and a RAM (Random Access Memory). Alternatively, the integration controller 51 may be constituted of a dedicated IC such as an FPGA (field programmable gate array). The integration controller 51 exchanges various signals with the illumination controller 52, the stage drive controller 53, the condenser lens drive controller 54, the observation image capturing controller 55, the thumbnail image capturing controller 56, the phase difference image capturing controller 57, the storage unit 58, the development unit 59, the image coding unit 60, the communication unit 61, and the display controller 62, and executes various types of arithmetic processing and control to acquire an observation image. Various programs and various types of data for the various types of arithmetic processing and control are loaded to the RAM. The CPU executes the programs loaded to the RAM. The ROM stores the programs and data loaded to the RAM.

The illumination controller 52, the stage drive controller 53, the condenser lens drive controller 54, the phase difference image capturing controller 57, the thumbnail image capturing controller 56, and the observation image capturing controller 55 may be each constituted of hardware elements of a computer including, for example, a CPU, a ROM, and a RAM or may be constituted of a dedicated IC such as an FPGA.

The development unit 59 and the image coding unit 60 are each constituted of hardware elements of a computer including, for example, a CPU, a ROM, and a RAM. Alternatively, the development unit 59 and the image coding unit 60 may be constituted of a GPU (Graphics Processing Unit).

The illumination controller 52 controls the light sources 11 and 21 according to an instruction on an illumination method for the sample SPL. The instruction is given from the integration controller 51. For example, the illumination controller 52 selects the type of light source, such as the intensity of illumination light of the light sources 11 and 21, a light source for a bright field, a light source for a dark field, and the like according to the instruction from the integration controller 51. Examples of the light source for a bright field include a light source that applies visible light. Examples of the light source for a dark field include a light source to apply light having a wavelength that can excite a fluorescent marker used in special staining.

For example, when receiving an instruction from the integration controller 51 to capture a thumbnail image, the stage drive controller 53 drives the stage drive mechanism 41 to move the stage 40 in a stage surface direction (in x- and y-axis directions) in such a way that the entire preparation PRT falls within the imaging range of the imaging device 13. The stage drive controller 53 drives the stage drive mechanism 41 to move the stage 40 in the z-axis direction in such a way that the objective lens 12 is focused on the entire preparation PRT. Further, when receiving an instruction from the integration controller 51 to capture an observation image, the stage drive controller 53 drives the stage drive mechanism 41 to move the stage 40 in the stage surface direction in such a way that the small area of the instructed sample SPL falls within the imaging range of the imaging device 24. The stage drive controller 53 drives the stage drive mechanism 41 to move the stage 40 in the z-axis direction in such a way that the objective lens 23 is focused on the sample SPL.

The condenser lens drive controller 54 controls the condenser lens drive mechanism 25 based on information on an illumination field stop from the integration controller 51, to adjust the illumination light from the light source 21 so as to be applied only to a small area of the sample SPL as an imaging target. The information on the illumination field stop includes the amount of defocus and the orientation of defocus. Those pieces of information are obtained based on a distance between the set of phase difference images generated by the phase difference image acquiring unit 30.

The phase difference image capturing controller 57 acquires signals of the set of phase difference images that are formed on the imaging surface of the imaging device 34 provided to the phase difference image acquiring unit 30, and supplies the signals to the integration controller 51. The integration controller 51 calculates the amount of defocus and the orientation of defocus of the focal point of the objective lens 23 of the observation image capturing unit 20 with respect to the sample SPL, based on the distance between the set of phase difference images that are acquired from the phase difference image capturing controller 57. Based on those pieces of information, the integration controller 51 generates control information for the stage 40 and supplies the control information to the stage drive controller 53. The stage drive controller 53 drives the stage drive mechanism 41 to move the stage 40 in the z-axis direction based on the control information from the integration controller 51. Thus, the phase difference AF (autofocusing) in which the objective lens 23 of the observation image capturing unit 20 is focused on the sample SPL is performed.

Based on a signal corresponding to a thumbnail formed on the imaging surface of the imaging device 13 of the thumbnail image capturing unit 10, the thumbnail image capturing controller 56 generates data corresponding to the thumbnail image and supplies the data to the integration controller 51.

The integration controller 51 detects an area including the sample SPL as a sample area from the thumbnail image acquired by the thumbnail image capturing controller 56. Additionally, the integration controller 51 partitions the sample area into a plurality of areas in a mesh pattern, the plurality of areas each having a size corresponding to the field of view of the observation image capturing unit 20, and performs processing such as setting each of the areas as an area corresponding to one-time imaging by the observation image capturing unit 20, and the like. Hereinafter, this area is referred to as a "small area".

The observation image capturing controller 55 generates, based on a signal corresponding to an observation image of each small area that is formed on the imaging surface of the imaging device 24 of the observation image capturing unit 20, raw data corresponding to the observation image of each small area and supplies the raw data to the integration controller 51. The integration controller 51 supplies the raw data of each small area, which has been acquired from the observation image capturing controller 55, to the development unit 59, so that the development unit 59 executes development processing. The integration controller 51 connects the data of the observation images of respective small areas, which have been developed by the development unit 59, to generate a large image for each sample SPL, and performs processing of dividing the generated large image for each sample SPL into units of a predetermined resolution that is called tile, and other processing. Further, the integration controller 51 supplies each of the generated tiles to the image coding unit 60 and causes the image coding unit 60 to generate image data in a predetermined compression coding format and the storage unit 58 to store the image data.

The storage unit 58 stores various types of setting information or programs for controlling the digital microscope apparatus 100, tile groups in the predetermined compression coding format, and the like.

The development unit 59 develops the raw data of the observation image of each small area that has been captured by the observation image capturing unit 20.

The image coding unit 60 codes the image data for each tile in the predetermined image compression format. Here, for example, JPEG (Joint Photographic Experts Group) is adopted as the image compression format. As a matter of course, compression coding formats other than JPEG may be adopted.

The tiles stored in the storage unit 58 are accumulated in an image management server 81 by the communication unit 61 through a network 80. In response to a request from a viewer terminal 82, the image management server 81 sends one or more appropriate tiles to the viewer terminal 82. The viewer terminal 82 generates an observation image for display by using the one or more tiles acquired from the image management server 81 and displays the observation image on a display of the viewer terminal 82.

The display controller 62 generates screen data to be displayed on a display 90 that is connected to the digital microscope apparatus 100.

(Autofocusing of Observation Image Capturing System)

In the digital microscope apparatus 100 according to this embodiment, a phase difference autofocusing and a contrast autofocusing are implemented as autofocus functions of automatically focusing the objective lens 23 of the observation image capturing unit 20 on the sample SPL serving as an imaging target.

In the phase difference autofocusing, the integration controller 51 instructs the phase difference image capturing controller 57 to capture a phase difference image. When receiving the instruction, the phase difference image capturing controller 57 takes in signals of a set of phase difference images that are formed side by side on the imaging surface of the imaging device 34 from the phase difference image acquiring unit 30, and obtains a phase difference between those phase difference images.

In the observation image capturing unit 20, as the focal point of the objective lens 23 is farther than an appropriate surface, identical areas of observed surfaces on the two phase difference images move so as to be separated from each other toward the outward direction of the imaging device 24. Conversely, as the focal point of the objective lens 23 is closer than the appropriate surface, the identical areas of the observed surfaces on the two phase difference images move so as to be close to each other toward the inward direction of the imaging device 24. The integration controller 51 obtains a distance between the identical areas of the observed surfaces on the two phase difference images as a phase difference.

The integration controller 51 obtains, based on the obtained phase difference, the amount of defocus and the orientation of defocus of the focal point of the objective lens 23 with respect to the sample SPL. The integration controller 51 generates control information for the stage 40 based on the obtained amount and orientation of defocus and supplies the control information to the stage drive controller 53. The stage drive controller 53 drives the stage drive mechanism 41 to move the stage 40 in the z-axis direction based on the control information from the integration controller 51. Thus, the phase difference autofocusing that focuses the objective lens 23 of the observation image capturing unit 20 on the sample SPL is performed.

The phase difference autofocusing allows a focal position to be obtained at higher speed than the contrast autofocusing without the search for a focal position. Conversely, there is a possibility that the accuracy is lowered due to the size of an object within the imaging surface or due to the number of tissues.

In contrast, the contrast autofocusing is a method in which a focal position is searched for in a hill climbing method by use of the observation image capturing unit 20. In the contrast autofocusing, the integration controller 51 displaces the focal position of the objective lens 23 by a predetermined distance and causes the observation image capturing unit 20 to perform imaging at respective focal positions. The integration controller 51 determines a focal position when an image having a highest contrast in the captured images is captured, as an optimal focal position.

In general, it is thought that the contrast autofocusing provides higher accuracy in focal point than the phase difference autofocusing. However, because the focal position is searched for, the contrast autofocusing involves repetitive movements and evaluations of the focal position of the objective lens. Consequently, it takes a relatively long time to obtain the focal position (focal position search time).

Additionally, there is a case where sufficient accuracy in focal point may not be obtained by any of the phase difference autofocusing and the contrast autofocusing. For example, in the case where the sample SPL is sealed in the preparation PRT at a large inclination angle with respect to the glass slide surface, there is a possibility that such blurring that is out of the allowable range partially occurs at any height position set for the focal point.

As described above, in the digital microscope apparatus, a focal point is detected for each small area by the phase difference autofocusing or the contrast autofocusing, so that an observation image is captured. Thus, images may be captured in an insufficient in-focus state depending on areas. In this case, the observation image of each small area is blurred as a whole or partially. However, a blurred part of such a blurred observation image has been discovered only when a user observes a large image that is generated by connecting such blurred observation images of respective small areas by stitching processing, because the blurred part is more prominent than the adjacent observation images.

In order to improve such circumstances, the digital microscope apparatus 100 according to this embodiment has the following functions.

Specifically, the digital microscope apparatus 100 according to this embodiment sets one or more evaluation areas for the observation image of each small area, which has been captured by the observation image capturing unit 20, and performs an edge detection on each evaluation area. Subsequently, the digital microscope apparatus 100 calculates a difference in blur evaluation amount between two observation images by using results of the edge detection on two evaluation areas. The two evaluation areas are located closest among any pairs of adjacent observation images in the connected image obtained by connecting a plurality of observation images. The digital microscope apparatus 100 determines a boundary part between those two observation images, in which a difference in blur evaluation amount between the two observation images is out of a predetermined allowable range, as a blurred boundary part. Based on the determination results, the digital microscope apparatus 100 determines a small area to be reimaged by the observation image capturing unit 20 and a reimaging condition for such a small area.

Hereinafter, the details of such functions will be described.

(Function of Integration Controller 51)

Figure 2:
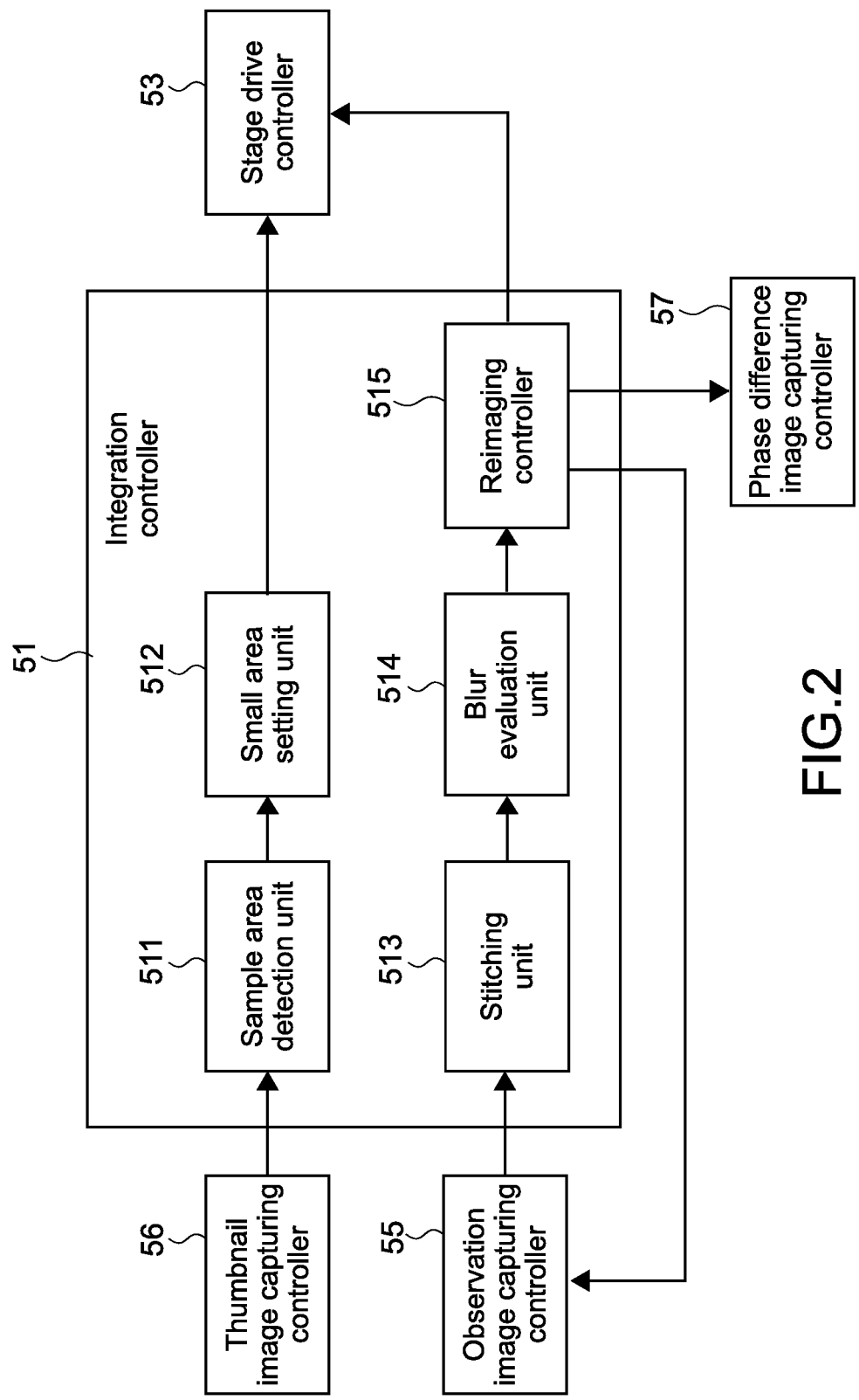
FIG. 2 is a functional block diagram of an integration controller in the digital microscope apparatus shown in FIG. 1.

FIG. 2 is a functional block diagram of the integration controller 51.

As shown in FIG. 2, the integration controller 51 includes a sample area detection unit 511, a small area setting unit 512, a stitching unit 513, a blur evaluation unit 514, and a reimaging controller 515. Those functions are achieved when a CPU in the integration controller 51 executes a program loaded to a RAM.

In the thumbnail image that has been acquired by the thumbnail image capturing controller 56 using the thumbnail image capturing unit 10, the sample area detection unit 511 detects an area including the sample SPL as a sample area. The sample area detection unit 511 determines a sample area in the thumbnail image based on a distribution of pixels whose luminance values drastically change, for example. The pixels whose luminance values drastically change are detected by, for example, a method of detecting a boundary of samples by edge detection. It should be noted that a user can manually perform the determination of sample areas by observing the thumbnail image on a monitor.

The small area setting unit 512 partitions the sample area, which has been detected by the sample area detection unit 511, into a plurality of areas in a mesh pattern in a size unit corresponding to the field of view of the observation image capturing unit 20 and sets each of the partitioned areas as an area (small area) corresponding to one-time imaging by the observation image capturing unit 20. The small area setting unit 512 gives information on the position of each small area to the stage drive controller 53. Based on the given information on the position of each small area, the stage drive controller 53 drives the stage drive mechanism 41 to move the stage 40 such that the small areas sequentially fall within the imaging range of the observation image capturing unit 20. Subsequently, the small area setting unit 512 instructs the observation image capturing controller 55 to capture images of the small areas.

The stitching unit 513 connects observation images of the plurality of small areas, which have been captured by the observation image capturing controller 55, and generates a large image (connected image) in units of the sample SPL.

The blur evaluation unit 514 sets one or more evaluation areas for the observation image of each small area and performs an edge detection on each evaluation area, to calculate a difference in blur evaluation amount between two observation images by using results of the edge detection on two evaluation areas. The two evaluation areas are located closest among any pairs of adjacent observation images in the connected image. The blur evaluation unit 514 determines a boundary part between those two observation images, in which a difference in blur evaluation amount between the two observation images is out of a predetermined allowable range, as a blurred boundary part. The blur evaluation unit 514 determines, based on the determination results of the blurred boundary part, a small area to be reimaged by the observation image capturing unit 20 and a reimaging condition for such a small area. Hereinafter, the above-mentioned series of processing by the blur evaluation unit 514 is referred to as "blur evaluation".

The reimaging controller 515 receives the small area to be reimaged and the reimaging condition, which have been determined by the blur evaluation unit 514, and controls the stage drive controller 53, the observation image capturing controller 55, and the phase difference image capturing controller 57 to execute reimaging of the small area to be reimaged.

(Flow of Imaging Operation)

Next, the flow of the imaging operation by the digital microscope apparatus 100 according to this embodiment will be described particularly focusing on the operations of the blur evaluation unit 514 and the reimaging controller 515.

Figure 3:
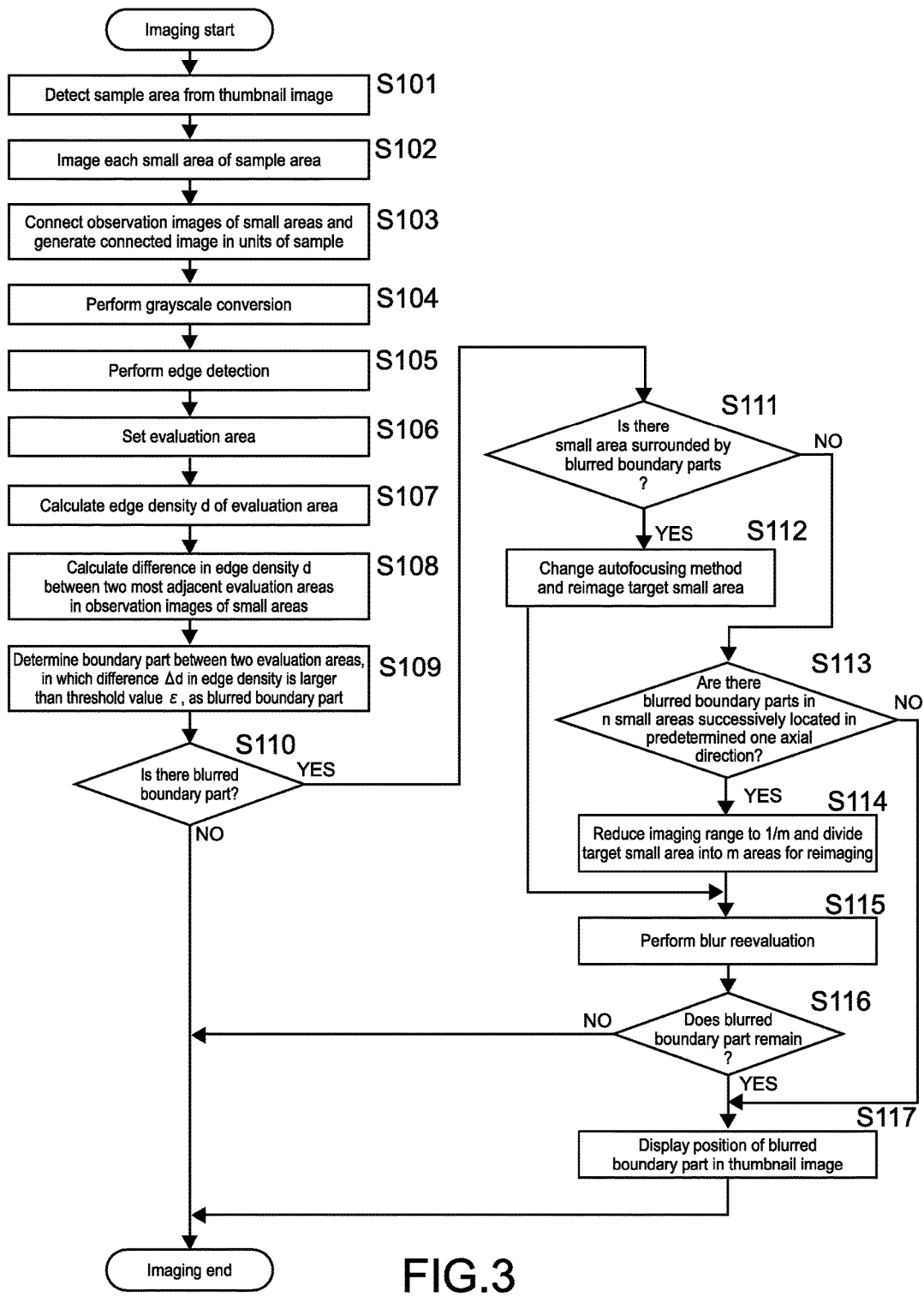
FIG. 3 is a flowchart showing a flow of an imaging operation by the digital microscope apparatus shown in FIG. 1.

FIG. 3 is a flowchart showing a flow of such an imaging operation.

First, a thumbnail image captured by the thumbnail image capturing unit 10 is supplied to the integration controller 51. When the integration controller 51 acquires the thumbnail image, the sample area detection unit 511 detects a sample area from the thumbnail image (Step S101).

Next, the small area setting unit 512 of the integration controller 51 sets a plurality of small areas for the sample area detected by the sample area detection unit 511, and instructs the observation image capturing controller 55 to capture an image while giving information on the positions of the plurality of small areas to the stage drive controller 53. Thus, the stage 40 is moved such that each small area falls within an imaging range of the observation image capturing unit 20, autofocusing is performed, and the small area is imaged by the observation image capturing unit 20 (Step S102). The autofocusing method executed when the observation image is captured may be any of the phase difference autofocusing and the contrast autofocusing. The autofocusing method for the first imaging may be appropriately selected by a user, for example.

Subsequently, the stitching unit 513 of the integration controller 51 connects the observation images of the respective small areas in the x- and y-axis directions and generates a large image (connected image) in units of the sample SPL (Step S103).

Next, the blur evaluation by the blur evaluation unit 514 will be performed as follows.

(Blur Evaluation by Blur Evaluation Unit 514)

The blur evaluation unit 514 converts the large image (connected image) in units of the sample SPL into a grayscale image having a predetermined bit number for the purpose of speed-up of processing (Step S104). At that time, for the purpose of further speed-up of processing, the large image (connected image) may be reduced in size before the conversion into a grayscale image, or an observation image converted into a grayscale image may be reduced in size. Alternatively, only the evaluation area may be cut out and converted into a grayscale image.

Next, the blur evaluation unit 514 performs an edge detection by filtering on the size-reduced observation image or the observation image converted into a grayscale image (Step S105). For the edge detection, for example, the Canny edge detection method or the like may be used. However, the present disclosure is not limited to this.

Next, the blur evaluation unit 514 sets a plurality of evaluation areas for the size-reduced observation image or the observation image converted into a grayscale image (Step S106). One or more evaluation areas are set for the observation image of each small area. It is desirable that the plurality of evaluation areas be set in the vicinity of the outer circumferential area of the observation image of each small area.

A specific setting method for the evaluation area will be described.

Figure 4:
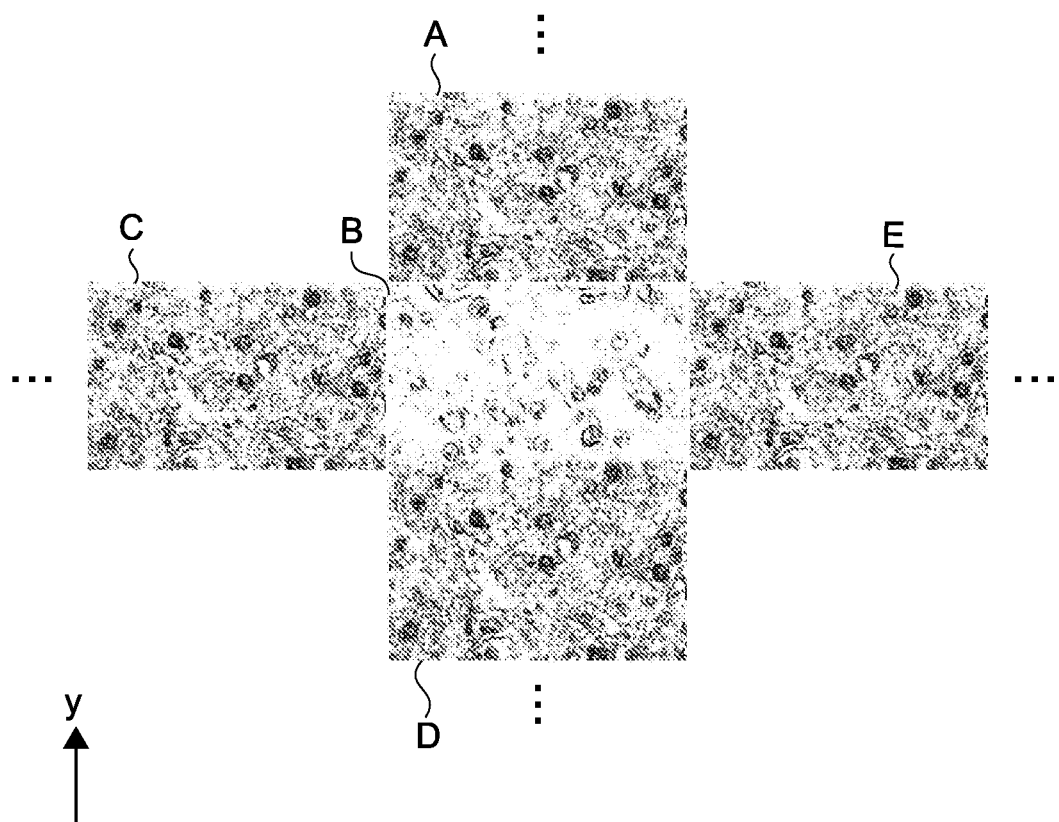
FIG. 4 is a diagram partially showing an observation image converted into a grayscale image.

FIG. 4 is a diagram partially showing an observation image converted into a grayscale image. Parts A, B, C, D, and E are observation images of small areas. Practically, the observation images of small areas other than the parts A to E are also connected in the x-axis direction and the y-axis direction, but the illustration thereof is omitted in FIG. 4.

Figure 5:
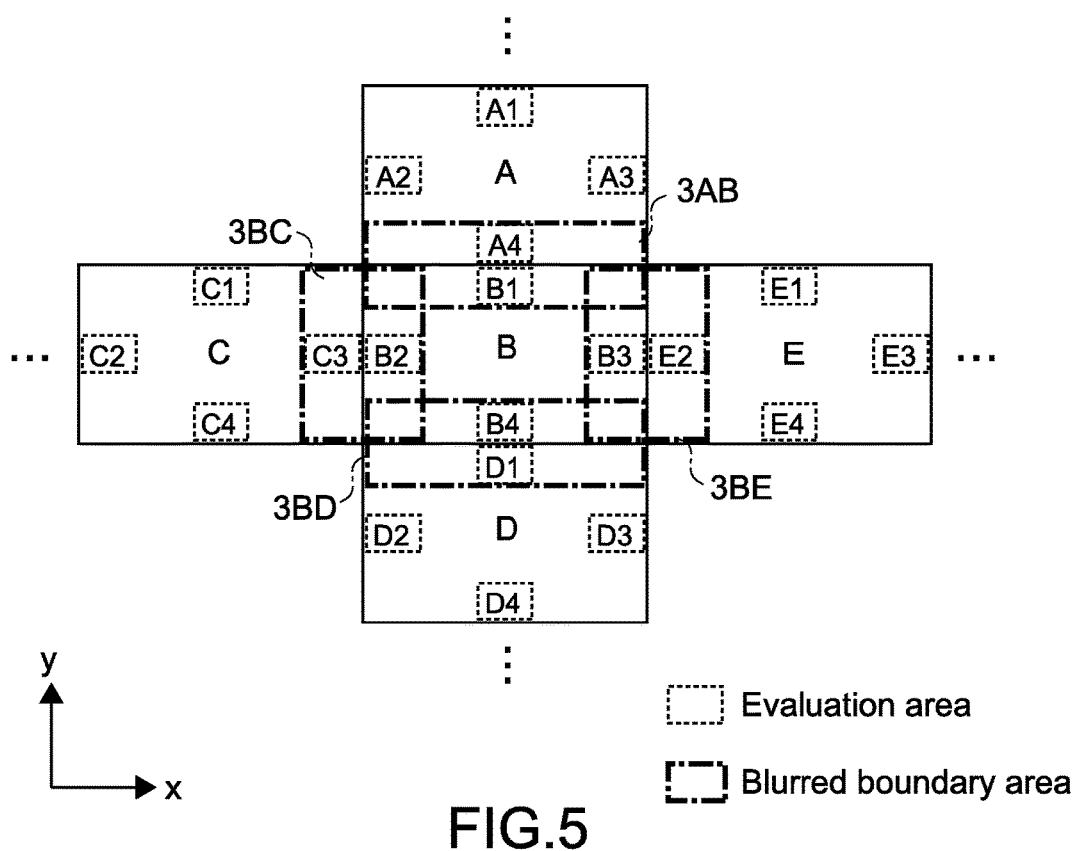
FIG. 5 is a diagram showing a specific setting example of evaluation areas in the observation image shown in FIG. 4 and determination results of blurred boundary parts.

FIG. 5 is a diagram showing a specific setting example of the evaluation area in the observation image shown in FIG. 4. Evaluation areas A1 to A4 are set in the observation image of a small area A. Evaluation areas B1 to B4 are set in the observation image of a small area B. Evaluation areas C1 to C4 are set in the observation image of a small area C. Evaluation areas D1 to D4 are set in the observation image of a small area D. Evaluation areas E1 to E4 are set in the observation image of a small area E. In this setting example, each evaluation area is set at the middle part of each of the four sides in the circumferential area of the observation image of each of the small areas A, B, C, D, and E.

Subsequently, for the respective evaluation areas, the blur evaluation unit 514 calculates a difference in blur evaluation amount between the observation images of two adjacent small areas by using the edge detection results described above. Specifically, the blur evaluation unit 514 first calculates an edge density d from the edge detection results (Step S107). The edge density d indicates, for example, a ratio of a part whose edge intensity obtained from the edge detection exceeds a threshold value in the evaluation area, and an average value of the edge intensity in the evaluation area. In general, as the blur evaluation amount becomes larger, the edge density d becomes smaller because a component with a high spatial frequency attenuates. As the blur evaluation amount becomes smaller, the edge density d becomes higher because many components with a high spatial frequency are contained.

Next, the blur evaluation unit 514 calculates an absolute value of a difference $\Delta d$ in edge density d between two evaluation areas. The two evaluation areas are located closest among any pairs of adjacent observation images of the small areas in the connected image. The blur evaluation unit 514 sets the absolute value as a difference in blur evaluation amount between those two observation images (Step S108).

For example, according to the setting example for the evaluation area shown in FIG. 5, the two closest evaluation areas in the adjacent observation images of the small areas in the connected image are A4 and B1, B2 and C3, B4 and D1, and B3 and E2. Here, an absolute value of a difference in edge density between A4 and B1 is represented by $|\Delta d_{A4-B1}|$, an absolute value of a difference in edge density between B2 and C3 is represented by $|\Delta d_{B2-C3}|$, an absolute value of a difference in edge density between B4 and D1 is represented by $|\Delta d_{B4-D1}|$, and an absolute value of a difference in edge density between B3 and E2 is represented by $|\Delta d_{B3-E2}|$.

The blur evaluation unit 514 determines a boundary part between those two evaluation areas, in which the absolute value of the difference $\Delta d$ in edge density d is larger than a predetermined threshold value $\varepsilon$, as a "blurred boundary part" whose difference in blur evaluation amount is out of the predetermined allowable range (Step S109). Specifically, if imaging is performed at an appropriate focal position for each of the two adjacent small areas, the two closest evaluation areas between the adjacent observation images of those small areas should have the same edge density d. When the difference $\Delta d$ in edge density between the two evaluation areas is large, this means that a boundary part of the observation image of at least one of the small areas is blurred at minimum.

Further, also in the case where no sample exists in one of the small areas, the difference $\Delta d$ in edge density becomes large. It should be noted that this can be avoided by the blur evaluation unit 514 determining whether a sample exists in the connected image or not and excluding an appropriate evaluation area from the blur evaluation. For example, the blur evaluation unit 514 can determine a position at which a sample exists by detecting an area equal to the background where no samples exist in the connected image or detecting an area containing color information derived from the staining of samples. In this case, an image to be used for the determination may be a thumbnail image by the thumbnail image capturing unit 10 or an observation image by the imaging device 13.

In the case where the relationship between each difference in edge density and the threshold value $\varepsilon$ is expressed as follows, for example, $|\Delta d_{A4-B1}|>\varepsilon$, $|\Delta d_{B2-C3}|>\varepsilon$, $|\Delta d_{B4-D1}|>\varepsilon$, and $|\Delta d_{B3-E2}|>\varepsilon$, as shown in FIG. 5, the boundary part between the small area A and the small area B, the boundary part between the small area C and the small area B, the boundary part between the small area D and the small area B, and the boundary part between the small area E and the small area B are determined as a blurred boundary part 3AB, a blurred boundary part 3BC, a blurred boundary part 3BD, and a blurred boundary part 3BE, respectively.

Subsequently, based on the determination results of those blurred boundary parts, the blur evaluation unit 514 determines a small area to be reimaged by the observation image capturing unit 20 or determines a reimaging condition for a small area to be reimaged. More specifically, in the following manner, a small area to be reimaged and a reimaging condition for the small area to be reimaged are determined.

In the case where the blurred boundary parts are not detected (NO in Step S110), the imaging of this preparation PRT is assumed to be successfully performed, and thus the imaging processing for this preparation PRT is terminated. Subsequently, the imaging of the next preparation PRT is executed.

(Determination Method for Small Area to be Reimaged and Determination Method for Reimaging Condition)

The determination method for a small area to be reimaged includes the following methods.

1. First determination method to determine at least one small area surrounded by the blurred boundary parts as a small area to be reimaged.

2. Second determination method to determine, when the blurred boundary parts exist in n small areas successively located in a predetermined one axial direction (x-axis or y-axis direction), the n small areas as small areas to be reimaged, where n is an integer of 3 or more.

(Regarding First Determination Method)

When there is a small area surrounded in all directions by the blurred boundary parts (YES in Step S111), the blur evaluation unit 514 determines that small area as a small area to be reimaged. For example, as shown in FIG. 5, the observation image of the small area B is surrounded by the blurred boundary parts 3AB, 3BC, 3BD, and 3BE in all directions. In such a case, the observation image of the small area B is an overall blurred image in many cases. The blur evaluation unit 514 determines the small area B, which is surrounded in all directions by the blurred boundary parts, as a small area to be reimaged, and instructs the reimaging controller 515 to perform reimaging of the small area B under a first condition.

Additionally, in the case where there are a plurality of connected small areas surrounded by the blurred boundary parts, the blur evaluation unit 514 determines those small areas as small areas to be reimaged.

Figure 16:
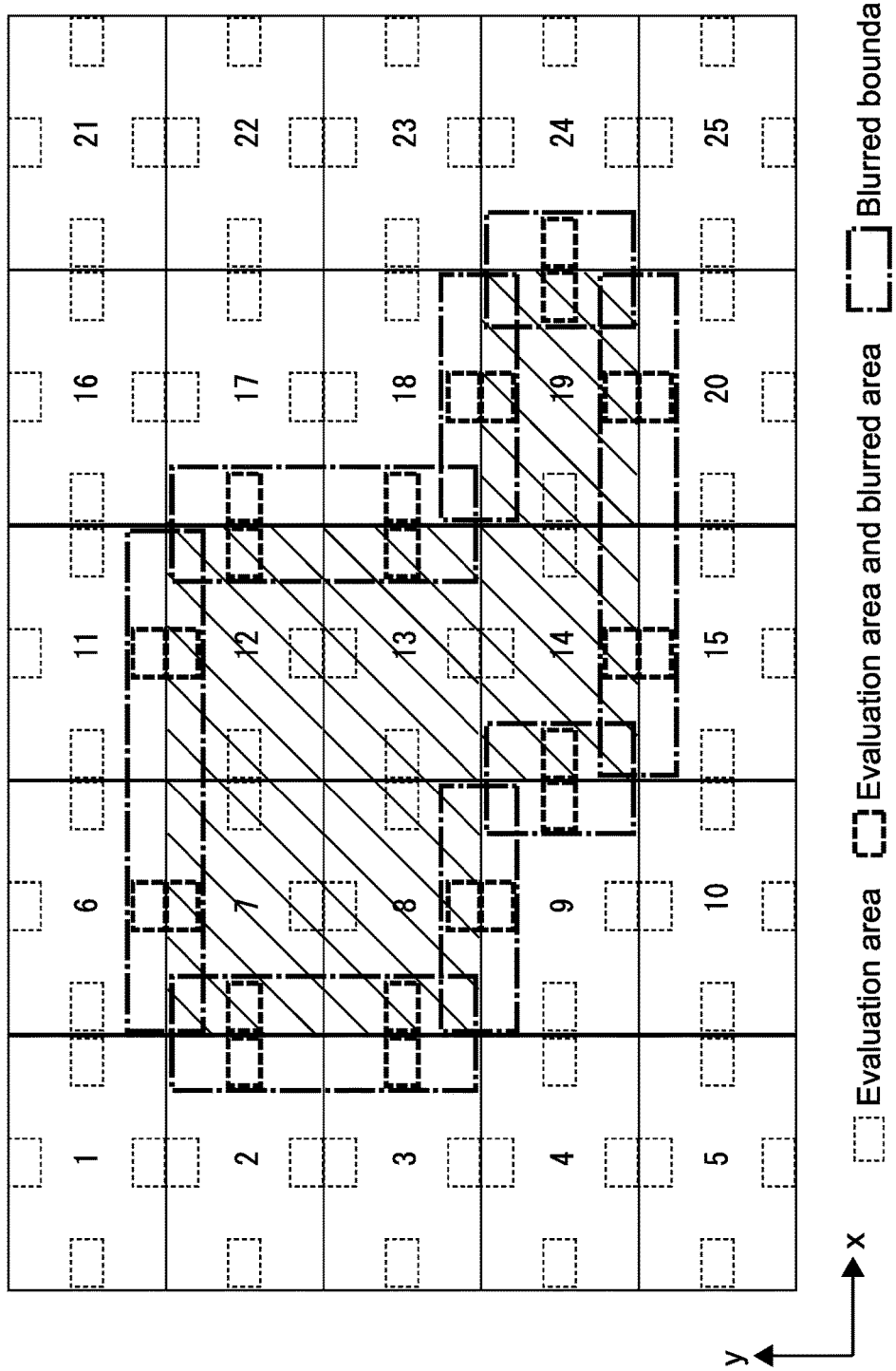
FIG. 16 is a diagram showing an example of a plurality of small areas that are surrounded by the blurred boundary parts and connected to one another.

FIG. 16 is a diagram showing an example of a plurality of small areas that are surrounded by the blurred boundary parts and connected to one another. For convenience of description, the small areas shown in FIG. 16 are denoted by shot numbers of 1 to 25. Here, 6 small areas with the shot numbers of 7, 8, 12, 13, 14, and 19 are determined as a plurality of small areas surrounded by the blurred boundary parts and connected to one another.

When receiving an instruction of reimaging of the small area B under the first condition, the reimaging controller 515 controls the stage drive controller 53, the observation image capturing controller 55, and the phase difference image capturing controller 57 to change the autofocusing method and reimage the small area B according to the first condition (Step S112). For example, in the case where focusing is performed by the phase difference autofocusing at the first imaging, the reimaging controller 515 performs control so as to search for a focal position by the contrast autofocusing at the reimaging. Conversely, in the case where the focal position is searched for by the contrast autofocusing at the first imaging, the reimaging controller 515 performs control so as to perform focusing by the phase difference autofocusing at the reimaging.

Consequently, a good observation image can be efficiently obtained by a more appropriate autofocusing method in accordance with the state of the observation target. For example, the imaging is performed by the phase difference autofocusing in order to give propriety to the efficiency at the first imaging, and reimaging is performed by switching to the contrast autofocusing as necessary. This allows an improvement in imaging efficiency for a lot of preparations PRT to be expected.

(Regarding Second Determination Method)

When determining that there are blurred boundary parts in n small areas successively located in a predetermined one axial direction (x-axis or y-axis direction) (YES in Step S113), the blur evaluation unit 514 determines the n small areas as small areas to be reimaged. Here, n is an integer of 3 or more.

Figure 6:
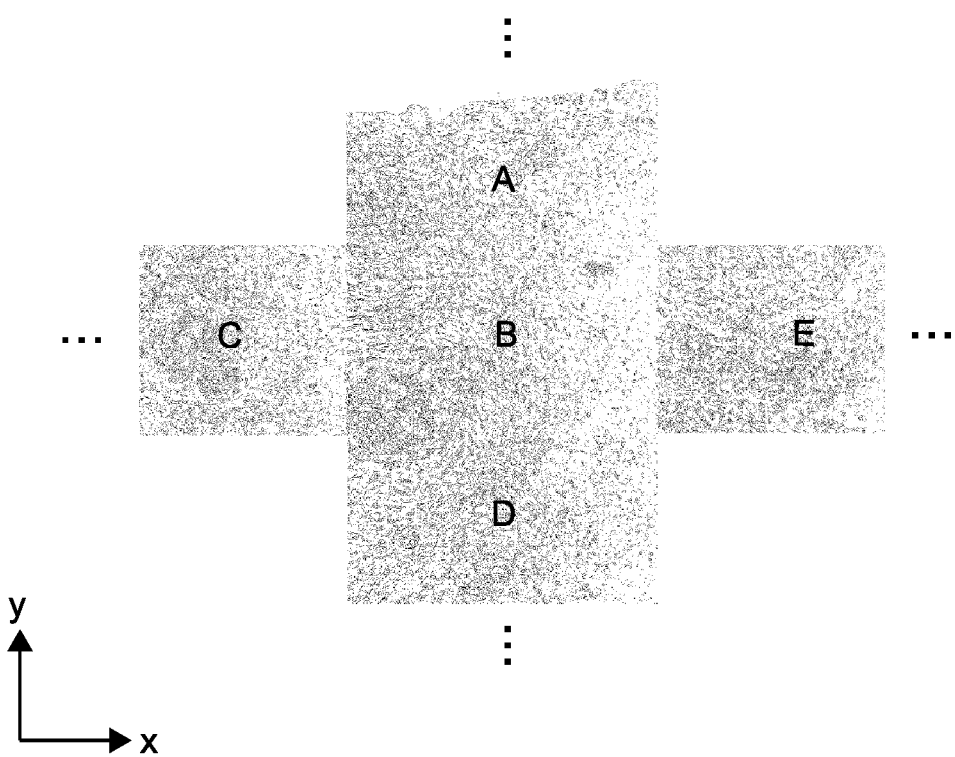
FIG. 6 is a diagram showing an example of an observation image, for which small areas to be reimaged are determined by a second determination method.
Figure 7:
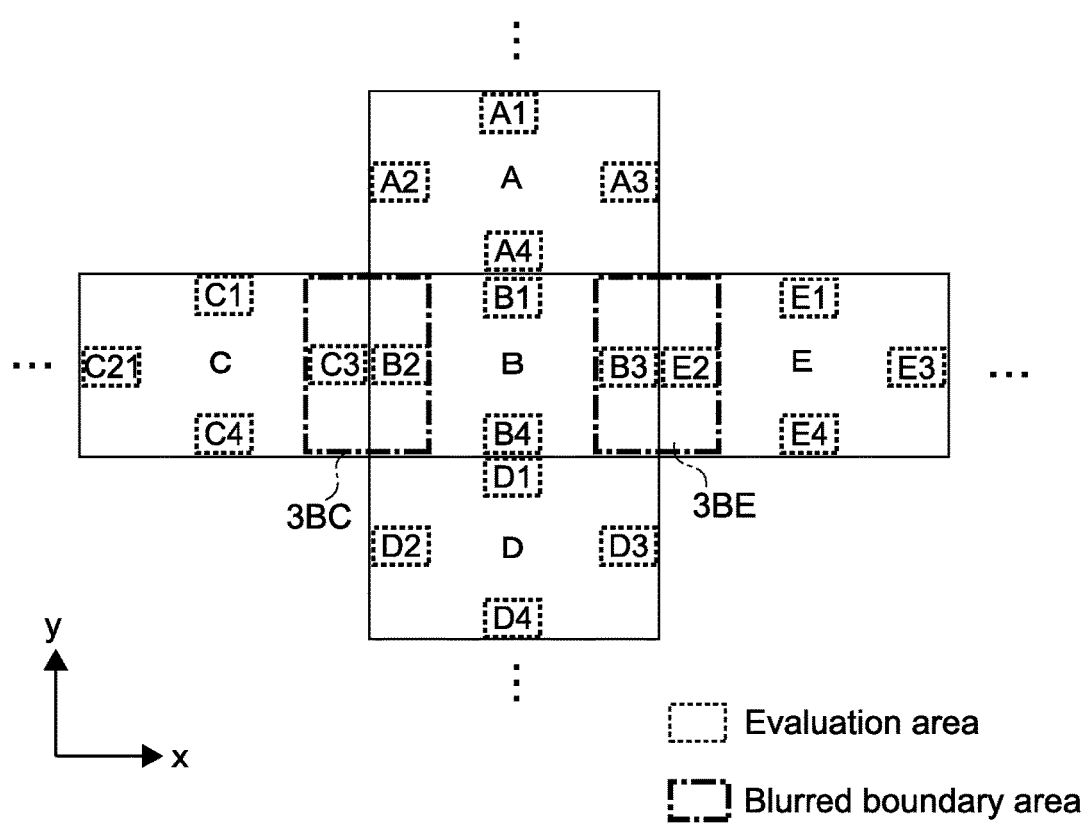
FIG. 7 is a diagram showing the determination results of the blurred boundary parts in the observation image shown in FIG. 6.

FIG. 6 is a diagram showing an example of the observation image, for which small areas to be reimaged are determined by the second determination method. As shown in FIG. 7, the evaluation area is set as described above. In this example, the expressions $|\Delta d_{B2-C3}|>\varepsilon$ and $|\Delta d_{B3-E2}|>\varepsilon$ are satisfied, while the expressions $|\Delta d_{A4-B1}|>\varepsilon$ and $|\Delta d_{B4-D1}|>\varepsilon$ are not satisfied. Consequently, in this example, as shown in FIG. 7, it is determined that the blurred boundary parts 3BC and 3BE exist between the three small areas B, C, and E, which are successively located in the x-axis direction. As a result, the small areas B, C, and E are determined as small areas to be reimaged. When determining such small areas B, C, and E to be reimaged, the blur evaluation unit 514 instructs the reimaging controller 515 to perform reimaging of the small areas B, C, and E under a second condition.

Factors causing periodic blurs in a predetermined one axial direction (x-axis or y-axis direction) in such a manner include the posture of the sample SPL, which is arranged at a large inclination angle with respect to a glass slide surface, and the like.

Further, also when a most area of the sample SPL is parallel to the glass slide surface, the end of the sample may be partially inclined at a large angle. Such a case also causes generation of periodic blurs in a predetermined one axial direction (x-axis or y-axis direction) easily.

Figure 8:
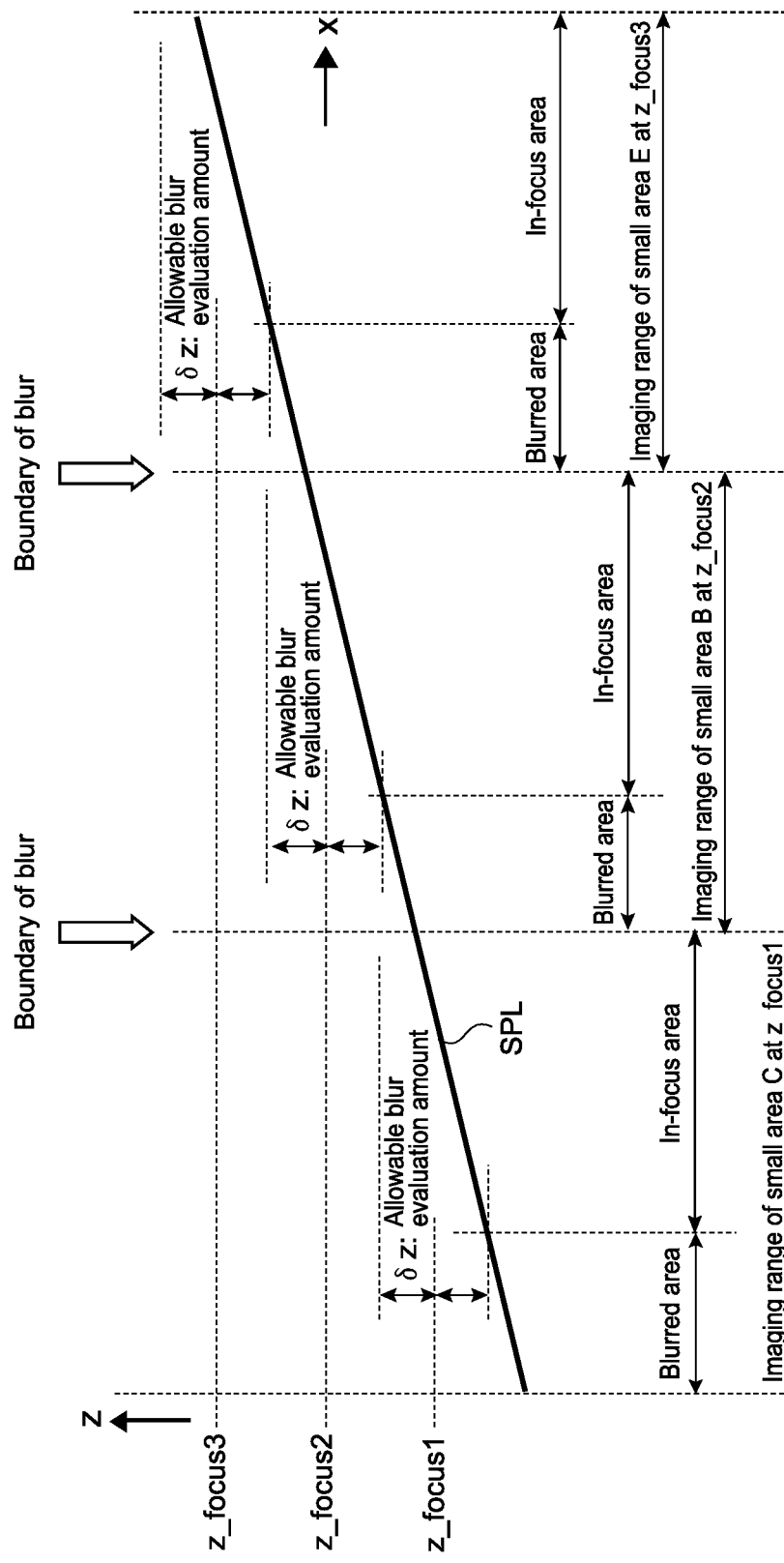
FIG. 8 is a diagram showing a relationship among an x-z-axis cross section of a part of a sample arranged at a large inclination angle with respect to a glass slide surface, a focal position, an imaging range for each focal position, an allowable blur evaluation amount, an in-focus area, and a blurred area.

FIG. 8 is a diagram showing a relationship among an x-z-axis cross section of a part (including small areas B, C, and E) of the sample SPL arranged at a large inclination angle with respect to the glass slide surface, which are shown in lower part of the diagram, focal positions z_focus1, z_focus2, and z_focus3, imaging ranges for the respective focal positions, allowable blur evaluation amounts δz, in-focus areas, and blurred areas.

In FIG. 8, the vertical axis indicates the optical axis direction z, and the horizontal axis indicates the x-axis direction. The position z_focus1 indicates a focal position when the small area C is imaged, the position z_focus2 indicates a focal position when the small area B is imaged, and the position z_focus3 indicates a focal position when the small area E is imaged. The blur evaluation amount is proportional to the difference between the focal position and the position of the sample SPL. Further, a part whose blur evaluation amount exceeds the range of a predetermined allowable blur evaluation amount δz due to the inclination of the sample SPL is defined as a "blurred area". A part whose blur evaluation amount falls within the range of the allowable blur evaluation amount δz is defined as an "in-focus area".

As shown in FIG. 8, when the sample SPL is arranged at a large inclination angle with respect to the glass slide surface, the blurred areas and the in-focus areas appear side by side with boundaries being interposed between the small areas over the small areas successively located in one axial direction (in this case, the x-axis direction). Specifically, the blurred boundary parts exist between the n small areas arranged in one axial direction (in this case, the x-axis direction). Thus, a determination condition of the second determination method described above is satisfied.

In such a manner, when determining the n small areas B, C, and E to be reimaged by the second determination method (YES in Step S113), the blur evaluation unit 514 instructs the reimaging controller 515 to perform reimaging of the small areas B, C, and E under the second condition.

When receiving the instruction of reimaging under the second condition, the reimaging controller 515 controls the stage drive controller 53, the observation image capturing controller 55, and the phase difference image capturing controller 57 to change the imaging range in the one axial direction of the observation image capturing unit 20 into 1/m of the imaging range at the first imaging and to divide one small area into m areas for reimaging (Step S114). It should be noted that the autofocusing method at the reimaging is the same as that of the first imaging. The value m is an integer of 2 or more.

Figure 9:
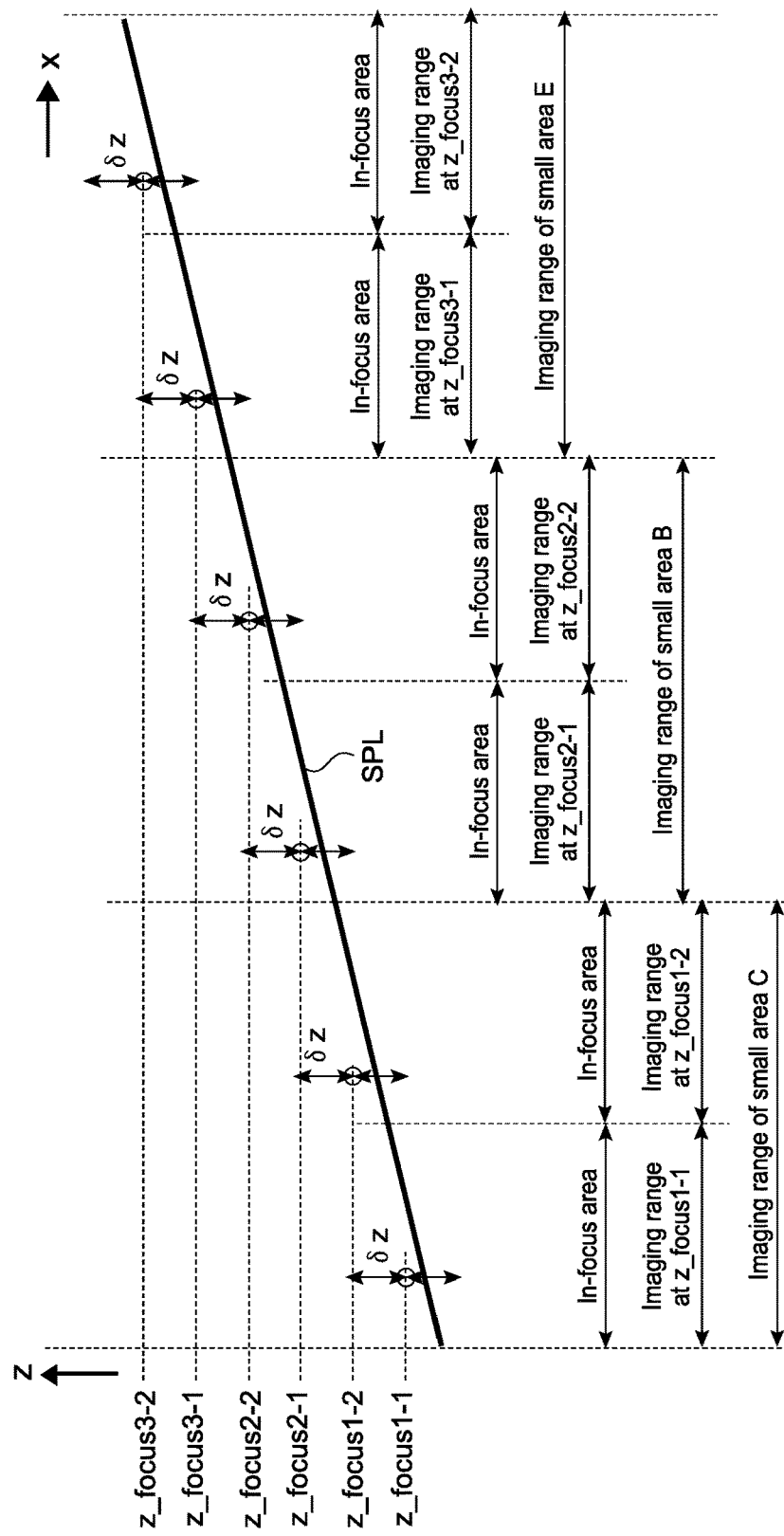
FIG. 9 is an explanatory diagram of reimaging.

FIG. 9 is a diagram showing a specific example of the reimaging. FIG. 9 shows an example in which the imaging range in the x-axis direction is changed into ½ of the imaging range at the first imaging, and each of the small areas B, C, and E to be reimaged is reimaged by ½ size in the x-axis direction by two times of imaging. As shown in FIG. 9, this example shows a case where a small area is divided into two areas arranged in the x-axis direction and reimaging is performed in a focal position obtained by autofocusing for each area. As a result, this example shows that the maximum blur evaluation amount falls within the range of the allowable blur evaluation amount $\delta z$ in each of the small areas B, C, and E, and a good observation image without a blurred area is obtained.

Although the case where the imaging range in the x-axis direction is changed into 1/m has been described, in the case where the in-focus areas and the blurred areas appear alternately over n small areas successively located in the y-axis direction, it is only necessary to change the imaging range in the y-axis direction into 1/m of the imaging range at the first imaging and divide each of the small areas B, C, and E into m areas for reimaging.

Examples of the method of changing the imaging range of the observation image capturing unit 20 into 1/m of the imaging range include the following methods.

1. A method of changing a feed amount of the stage 40 at the imaging, in the case where a line senor is used as the imaging device 34 of the observation image capturing unit 20.

2. A method of controlling the width of a read area in an x-axis direction or y-axis direction of an area sensor to be 1/m of the width of the read area at the first imaging, in the case where the area sensor is used as the imaging device 34 of the observation image capturing unit 20.

For the observation image that has been captured again as described above, the blur evaluation unit 514 performs the blur evaluation as in Steps S107 to S109 described above (Step S115). As a result of the blur evaluation, when it is determined that no blurred boundary parts remain (NO in Step S116), the imaging of this preparation PRT is assumed to be successfully performed, and thus the imaging processing for this preparation PRT is terminated. Subsequently, the imaging of the next preparation PRT is executed. Alternatively, when it is determined that one or more blurred boundary parts remain (YES in Step S116), the reimaging controller 515 considers that the search for a focal position has failed by the changed autofocusing method and performs control to clearly specify the positions of the blurred boundary parts on the screen on which a thumbnail image of the sample is displayed (Step S117).

Figure 10:
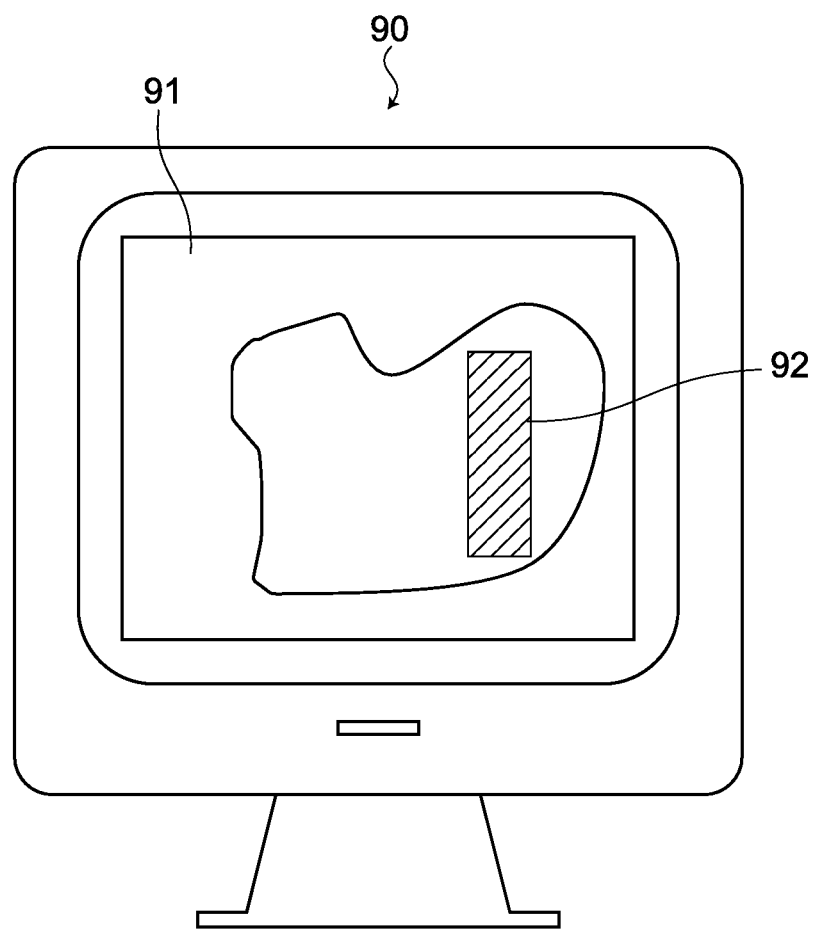
FIG. 10 is a diagram showing a display example in which the position of a blurred boundary part is clearly specified in a thumbnail image.

FIG. 10 is a diagram showing a display example in which the position of a blurred boundary part is clearly specified in a thumbnail image. Here, the display 90 may be a display apparatus directly connected to the controller 50 of the digital microscope apparatus 100. In a thumbnail image 91, the position of the blurred boundary part is clearly specified by a synthetic image 92 such as a frame line. It should be noted that the method of clearly specifying the position of the blurred boundary part is not limited to use of the synthetic image 92. The luminance, color, and the like of the observation image at the position of the blurred boundary part may be changed, so that the user can recognize the position of the blurred boundary part.

Further, for a user interface on the screen, in which the position of the blurred boundary part is clearly specified and displayed on the thumbnail image, an operating element (knob etc.) with which a user can change the setting of the threshold value $\epsilon$ may be provided. The change of the setting of the threshold value $\epsilon$ allows the blurred boundary part to be displayed in a state where the user easily recognizes the blurred boundary part. This allows an improvement in efficiency when the user checks the position of the blurred boundary part, for example, in the case where an allowable blur amount fluctuates depending on the sample. Additionally, the adjustment of the threshold value $\epsilon$ allows an improvement in detection accuracy of the blurred boundary part corresponding to the sample to be expected.

The user visually checks a blurred boundary part on the preparation PRT or checks a blurred boundary part by using an enlarged image while viewing the display of the position of the blurred boundary part. If dirt and the like are mixed in the preparation PRT, for example, the focal position is manually adjusted to perform reimaging.

Incidentally, depending on the setting value of n in the second determination method, there is a possibility that both of the determination conditions of the first determination method and the second determination method are simultaneously satisfied. In the case where the both of the determination conditions of the first and second determination methods are simultaneously satisfied, the following operations are performed.

1. Operation to validate the determination result by the first determination method.

2. Operation to select whether to validate the determination result by the first determination method or validate the determination result by the second determination method according to the setting value of n.

For example, when n is 3, the determination result by the first determination method is set to be valid, and when n is 4 or more, the determination result by the second determination method is set to be valid.

According to this embodiment, as described above, the following effects are obtained.

1. It is possible to satisfactorily obtain the difference in blur evaluation amount between observation images of two small areas that are adjacent to each other in the connected image.

2. It is possible to satisfactorily and efficiently determine, based on the difference in blur evaluation amount between the observation images of the small areas, whether a boundary part between the observation images is a blurred boundary part serving as a boundary part between a blurred area and an in-focus area.

3. It is possible to satisfactorily and efficiently determine the blurred boundary part and, as a result of this, satisfactorily determine a small area to be reimaged.

4. By using an autofocusing method at reimaging, which is different from the autofocusing method at the first imaging, it is possible to obtain an observation image by a more appropriate autofocusing method that corresponds to the state of a sample.

5. It is possible to obtain an observation image of a sample even from a preparation PRT in which the sample SPL is sealed in at a large inclination angle with respect to a glass slide surface, such a preparation PRT being reimaged by changing the imaging range in a predetermined one axial direction of the observation image capturing unit 20 into 1/m of the imaging range at the first imaging and to divide one small area into m areas.

Modified Example 1

In the embodiment described above, when it is determined that the blurred boundary parts exist between the n small areas that are successively arranged in a predetermined one axial direction (x-axis or y-axis direction), the imaging range in the one axial direction is changed into 1/m of the imaging range at the first imaging, and one small area is reimaged by m times of imaging. Instead of such control, a control operation of inclining the stage 40 or the optical system of the observation image capturing unit 20 so as to cancel the inclination of the sample SPL may be performed.

Alternatively, in the case where the sample SPL is partially inclined, a control operation of inclining the stage 40 or the optical system of the observation image capturing unit 20 at an appropriate position so as to locally cancel the inclination may be performed.

Figure 11:
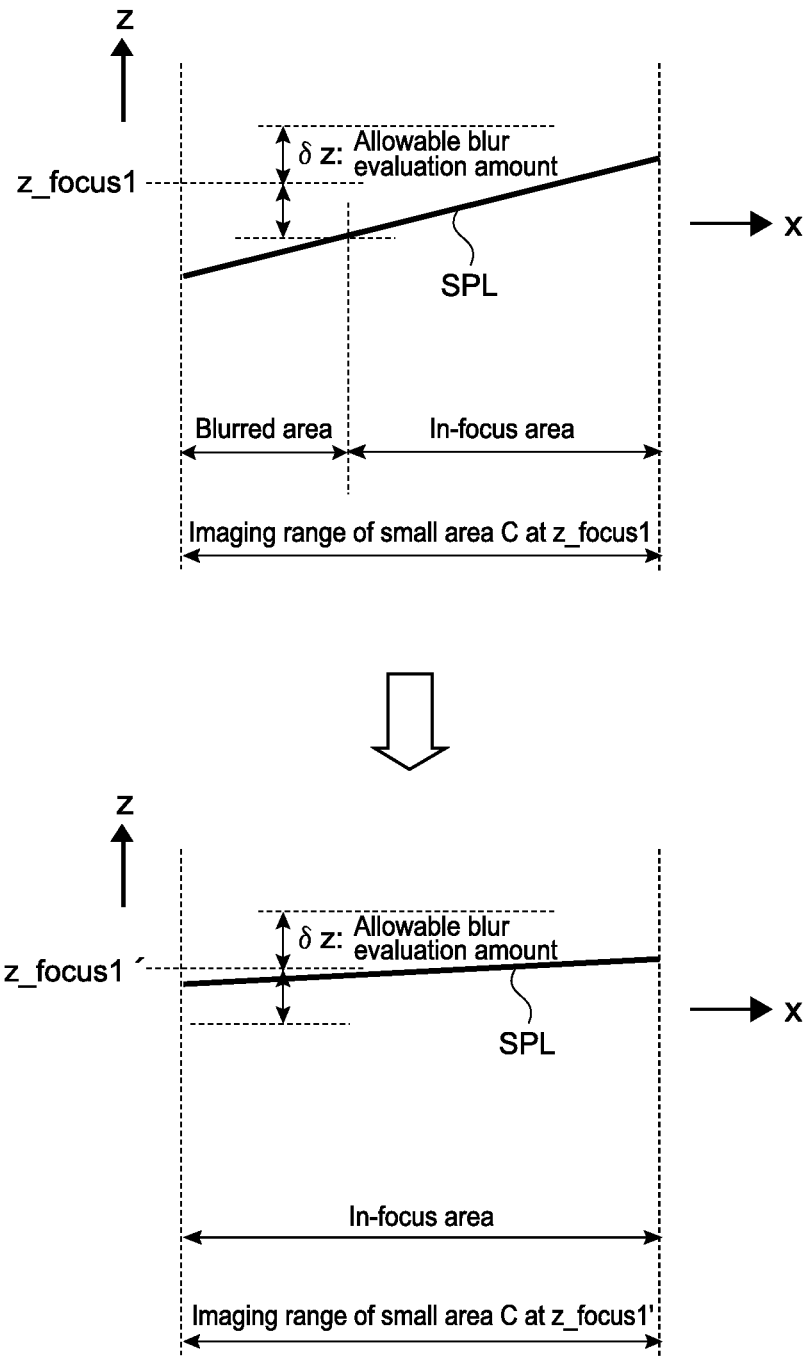
FIG. 11 is an explanatory diagram of reimaging by a modified example 1.

FIG. 11 is an explanatory diagram of reimaging by the modified example 1. As shown in FIG. 11, the stage 40 or the optical system of the observation image capturing unit 20 is inclined so as to cancel the inclination of the sample SPL. This may allow the sample SPL to fall within the range of the allowable blur evaluation amount δz over the entire imaging range and allow a good observation image without a blurred area to be obtained. In this case, the stage 40 or the optical system of the observation image capturing unit 20 is first inclined on the right-hand side of FIG. 11 so as to be raised by a predetermined angle, and then the blur evaluation is performed again. When a blurred boundary part remains, the stage 40 or the optical system of the observation image capturing unit 20 only needs to be inversely inclined on the left-hand side of FIG. 11 so as to be raised by a predetermined angle to perform the imaging and the blur evaluation again. Additionally, for the angle to be inclined, the angle may be increased stepwise to repeat reimaging and reevaluation.

Modified Example 2

Figure 12:
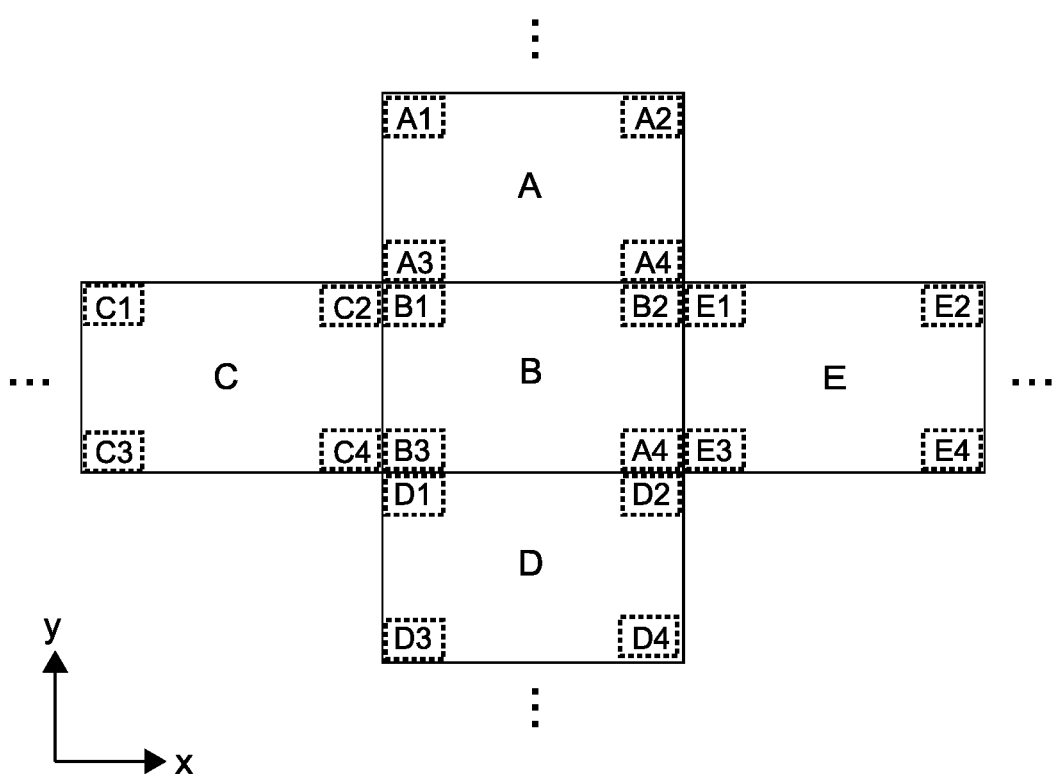
FIG. 12 is a diagram showing another setting method for the evaluation area.

For the evaluation area in the observation image, in the first embodiment, the evaluation area is set at the middle part of each of the four sides of the small area as shown in FIG. 5. However, the present disclosure is not limited thereto. As shown in FIG. 12, evaluation areas A1 to A4, B1 to B4, C1 to C4, D1 to D4, and E1 to E4 may be set at the four corners of the small areas A, B, C, D, and E, respectively. In this case, the two closest evaluation areas among adjacent small areas in the connected image are two pairs, i.e., A3 and B1, and A4 and B2, in the case of the small area A and the small area B. When an absolute value of a difference in edge density between A3 and B1 is represented by $|\Delta d_{A3\text{-}B1}|$ and an absolute value of a difference in edge density between A4 and B2 is represented by $|\Delta d_{A4\text{-}B2}|$ and when $(|\Delta d_{A3\text{-}B1}|+|\Delta d_{A4\text{-}B2}|)/2 > \varepsilon$, a boundary part between the small area A and the small area B is determined as a blurred boundary part.

The blur evaluation for the other small areas is similarly performed. For example, in the case of the small area B and the small area C, the two closest evaluation areas among adjacent small areas in the connected image are two pairs, i.e., B1 and C2, and B3 and C4. The blur evaluation is performed by the same calculation method as that described above.

Figure 13:
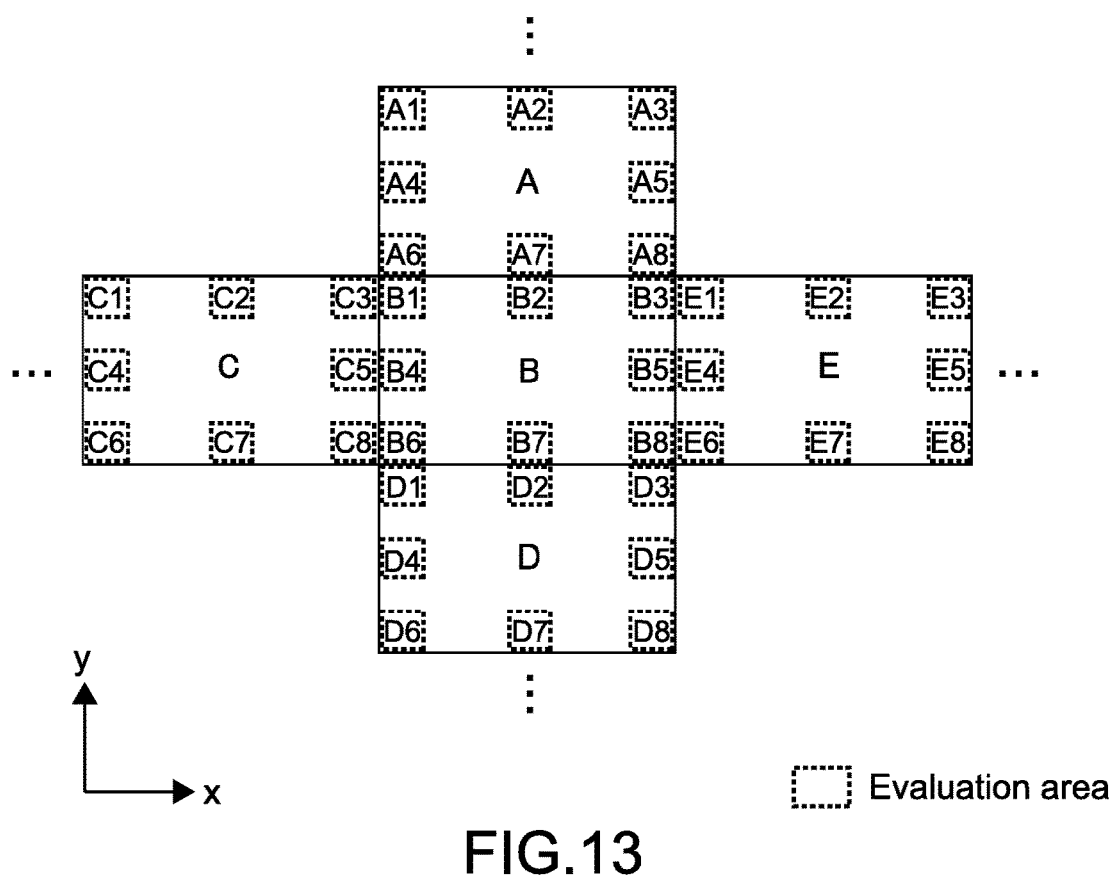
FIG. 13 is a diagram showing another setting method for the evaluation area.

Alternatively, as shown in FIG. 13, three or more evaluation areas A1 to A8, B1 to B8, C1 to C8, D1 to D8, and E1 to E8 may be set for respective sides of the observation images of the small areas A, B, C, D, and E, respectively. The calculation method for the blur evaluation in this case is also the same calculation method as that described above.

Figure 14:
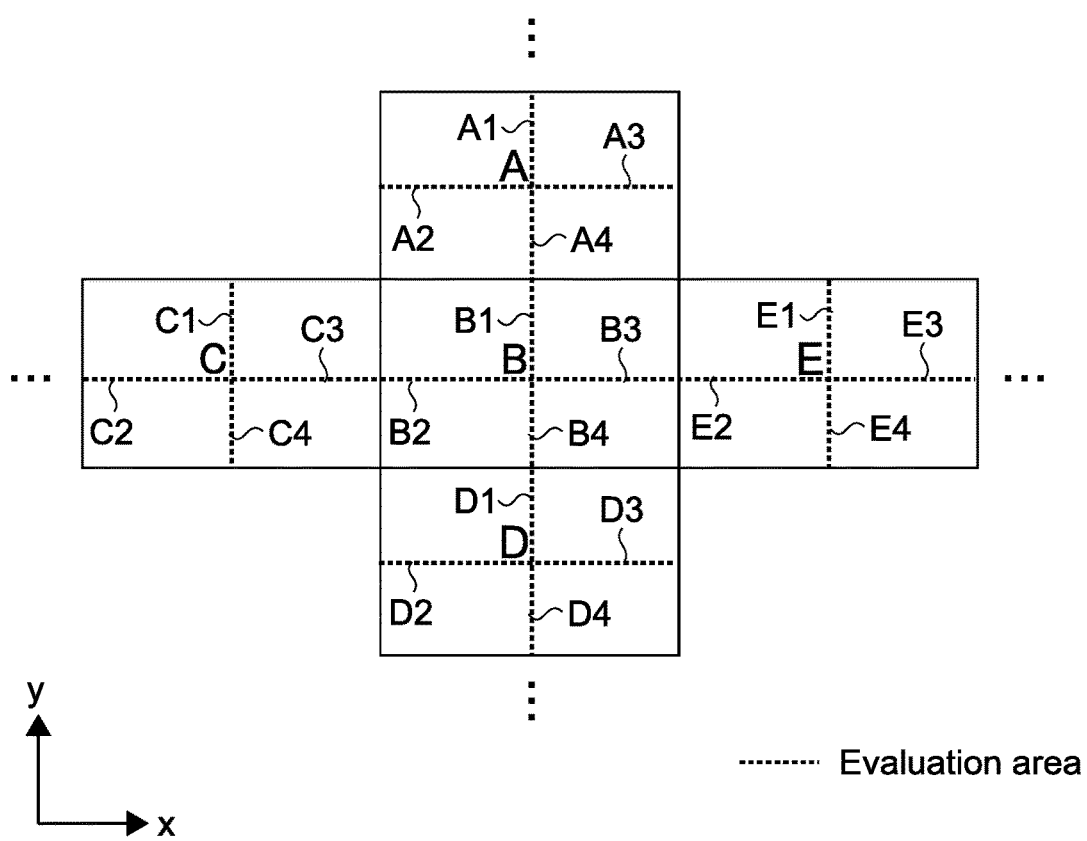
FIG. 14 is a diagram showing another setting method for the evaluation area.

Further, the evaluation areas are not necessarily set near the outer circumferential area of the small area. For example, as shown in FIG. 14, the small areas A, B, C, D, and E are each provided with a total of four straight lines that are constituted of two straight lines dividing the small area into two in the y-axis direction and dividing the small area into two in the x-axis direction and that intersect one another. Evaluation areas A1 to A4, B1 to B4, C1 to C4, D1 to D4, and E1 to E4 may be assigned to those four lines of the respective areas.

Modified Example 3

It is desirable to ensure as much as possible that the evaluation area is a sample area. The difference Δd in edge density between an area where no sample exists (non-sample area) and the sample area tends to increase. Thus, in the case where one of the two closest evaluation areas among the observation images of the small areas includes a non-sample area, if the observation images of both the small areas are in focus, the one evaluation area may be erroneously determined as a boundary part or a blurred boundary part between those small areas.

For example, the sample area detection unit 511 detects a sample area and this sample area is set as an imaging target for an observation image. However, since the imaging is performed in units of the imaging range of the observation image capturing unit 20, actually, a small area containing a non-sample part is also imaged in some cases.

In this regard, the following processing can be additionally performed.

1. The blur evaluation unit 514 acquires positional information of a sample area from the sample area detection unit 511. The positional information of the sample area naturally has a much higher resolution than the imaging range of the observation image capturing unit 20.

2. When setting an evaluation area for the small area, the blur evaluation unit 514 selects a position in which a non-sample area is not contained in the evaluation area based on the positional information of the sample area, and sets an evaluation area. Alternatively, the size or form of the evaluation area may be changed.

Thus, the non-sample area can be prevented from being contained in the evaluation area, and this allows an increase in accuracy of the blur evaluation.

Modified Example 4

In the first embodiment described above, the observation images of the plurality of small areas are connected to generate a connected image, and then the processing of blur evaluation by the blur evaluation unit 514 is performed.

However, the present disclosure is not limited thereto.

Figure 15:
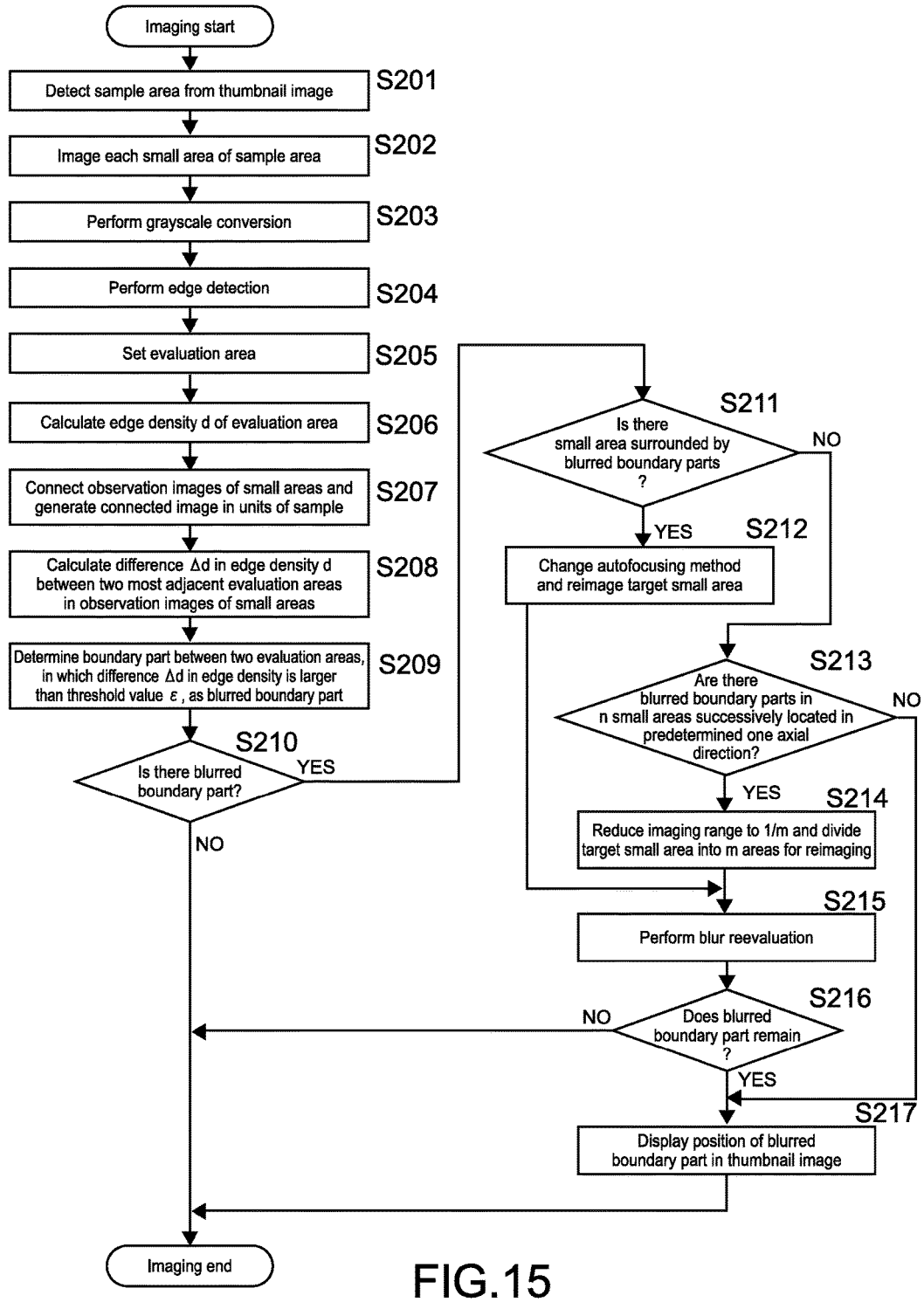
FIG. 15 is a flowchart of an imaging operation for describing a modified example 4.

For example, as shown in FIG. 15, a gray scale conversion (Step S203), an edge detection (Step S204), the setting of an evaluation area (Step S205), and the calculation of an edge density d (Step S206) may executed in units of the observation image of the small area and then observation images of a plurality of small areas may be connected (Step S207). Subsequently, the calculation of a difference Δd in edge density (Step S208) and the determination of a blurred boundary part (Step S209) are similarly performed.

Modified Example 5

In the embodiment described above, the autofocusing method is changed and the imaging range is changed to 1/m to reevaluate the observation image of one small area reimaged by m times, and as a result of this evaluation, when a blurred boundary part remains, the position of the blurred boundary part is clearly specified on the screen on which a thumbnail image of the sample is displayed. The present disclosure is not limited thereto. In the case where a blurred boundary part is detected by the blur evaluation performed on the observation image obtained at the first imaging, the position of the blurred boundary part may be clearly specified on the screen on which a thumbnail image of the sample is displayed.

It should be noted that the present disclosure can take the following configurations.
(1) A digital microscope apparatus, including:
an observation image capturing unit configured to capture an observation image of each of a plurality of small areas, an area containing a sample on a glass slide being partitioned by the plurality of small areas; and
a controller configured
to set at least one evaluation area for the observation image of each of the plurality of small areas, the observation image being captured by the observation image capturing unit,
to perform an edge detection on the at least one evaluation area, and
to calculate, using results of the edge detection on two evaluation areas that are closest between two of the observation images adjacently located in a connected image, a difference in blur evaluation amount between the two observation images, the connected image being obtained by connecting the observation images according to the partition.
(2) The digital microscope apparatus according to (1), in which
the controller is configured to determine, as a blurred boundary part, a boundary part located between the observation images and having a difference in blur evaluation amount that is out of a predetermined allowable range.
(3) The digital microscope apparatus according to (2), in which
the controller is configured to determine, based on a result of the determination of the blurred boundary part, a small area to be reimaged by the observation image capturing unit and a condition of the reimaging for the small area to be reimaged.
(4) The digital microscope apparatus according to any one of (1) to (3), in which
the controller is configured to determine the small area surrounded by the blurred boundary parts as the small area to be reimaged, and to determine to switch an autofocusing method, for the condition of the reimaging.
(5) The digital microscope apparatus according to any one of (1) to (4), in which
the controller is configured
to determine, when determining that the blurred boundary parts exist in n small areas successively located in a predetermined one axial direction (where n is an integer of 3 or more), the n small areas as small areas to be reimaged,
to change an imaging range in the one axial direction of the observation image capturing unit into 1/m of the imaging range at a first imaging (where m is an integer of 2 or more), for the condition of the reimaging, and
to determine to divide each of the small areas into m areas for reimaging.
(6) The digital microscope apparatus according to any one of (1) to (5), further including a thumbnail image capturing unit configured to capture an entire image of the sample on the glass slide, in which
the controller is configured to generate, when the blurred boundary part is determined again in the connected image containing the observation image of the small area that is reimaged by the observation image capturing unit, an image that clearly specifies a position of the blurred boundary part in a thumbnail image captured by the thumbnail image capturing unit and to display the image on a display.

It should be understood by those skilled in the art that various modifications, combinations, sub-combinations and alterations may occur depending on design requirements and other factors insofar as they are within the scope of the appended claims or the equivalents thereof.

What is claimed is:
1. A digital microscope system, comprising:
a first image sensor configured to:
capture, as a plurality of observation images, a first image of each of a plurality of small areas, to obtain a connected image of the plurality of observation images,
wherein each of the plurality of small areas is a partition of a first area of a slide containing a sample; and
circuitry configured to:
set a first plurality of evaluation areas in a first observation image of the plurality of observation images;
set a second plurality of evaluation areas in a second observation image of the plurality of observation images;
detect an edge of each of the first plurality of evaluation areas and the second plurality of evaluation areas,
wherein in the connected image, a first edge of a first evaluation area of the first plurality of evaluation areas is adjacent to a second edge of a second evaluation area of the second plurality of evaluation areas, and
wherein the first evaluation area and the second evaluation area are non-overlapped;
calculate, based on the first edge and the second edge, a first difference in a blur evaluation amount between the first observation image and the second observation image;
determine a reimaging area of the plurality of small areas based on the first difference; and
control the first image sensor to capture the reimaging area.
2. The digital microscope system according to claim 1, wherein the circuitry is further configured to:
determine, as a plurality of blurred boundary parts, a boundary part between each pair of adjacent observation images of the plurality of observation images, wherein a second difference in the blur evaluation amount between each pair of the adjacent observation images is out of a threshold range.

3. The digital microscope system according to claim 2, wherein the circuitry is further configured to determine, based on a blurred boundary part of the plurality of blurred boundary parts, a first small area of the plurality of small areas and a first condition, and
wherein the first image sensor is further configured to capture a second image of the first small area.

4. The digital microscope system according to claim 3, wherein the circuitry is further configured to:
determine, between the plurality of blurred boundary parts, a second small area of the plurality of small areas; and
switch to an autofocus method, for a second condition, and
wherein the first image sensor is further configured to capture a third image of the second small area.

5. The digital microscope system according to claim 2, wherein the circuitry is further configured to:
determine, a count of a first plurality of small areas of the plurality of small areas for which a first plurality of blurred boundary parts of the plurality of blurred boundary parts exist in the first plurality of small areas,
wherein the first plurality of small areas are successively located in an axial direction,
wherein the count is at least 3; and
change an imaging range in the axial direction of the first image sensor, for a third condition, and
wherein the first image sensor is further configured to capture a second image of each of the first plurality of small areas.

6. The digital microscope system according to claim 3, further comprising:
a second image sensor configured to capture a thumbnail image of the slide containing the sample,
wherein the circuitry is further configured to:
generate, based on the blurred boundary part of the second image, a position image that specifies a position of the blurred boundary part of the second image in the thumbnail image; and
control a display device to display the position image.

7. An imaging method, comprising:
in a digital microscope system:
capturing, as a plurality of observation images, an image of each of a plurality of small areas, to obtain a connected image of the plurality of observation images,
wherein each of the plurality of small areas is a partition of a first area of a slide containing a sample;
setting a first plurality of evaluation areas in a first observation image of the plurality of observation images;
setting a second plurality of evaluation areas in a second observation image of the plurality of observation images;
detecting an edge of each of the first plurality of evaluation areas and the second plurality of evaluation areas,
wherein in the connected image, a first edge of a first evaluation area of the first plurality of evaluation areas is adjacent to a second edge of a second evaluation area of the second plurality of evaluation areas, and
wherein the first evaluation area and the second evaluation area are non-overlapped;
calculating, based on the first edge and the second edge, a difference in a blur evaluation amount between the first observation image and the second observation image;
determining a reimaging area of the plurality of small areas based on the difference; and
controlling an image sensor to capture the reimaging area.

8. A non-transitory computer readable medium having stored thereon, computer-executable instructions, which when executed by a computer, cause the computer to execute operations, the operations comprising:
controlling an image sensor to capture, as a plurality of observation images, an image of each of a plurality of small areas, to obtain a connected image of the plurality of observation images,
wherein each of the plurality of small areas is a partition of a first area of a slide containing a sample;
setting a first plurality of evaluation areas in a first observation image of the plurality of observation images;
setting a second plurality of evaluation areas in a second observation image of the plurality of observation images;
detecting an edge of each of the first plurality of evaluation areas and the second plurality of evaluation areas,
wherein in the connected image, a first edge of a first evaluation area of the first plurality of evaluation areas is adjacent to a second edge of a second evaluation area of the second plurality of evaluation areas, and
wherein the first evaluation area and the second evaluation area are non-overlapped;
calculating, based on the first edge and the second edge, a difference in a blur evaluation amount between the first observation image and the second observation image;
determining a reimaging area of the plurality of small areas based on the difference; and
controlling the image sensor to capture the reimaging area.

9. The digital microscope system according to claim 1, wherein the first plurality of evaluation areas and the second plurality of evaluation areas exclude a non-sample area.

10. A digital microscope system, comprising:
an image sensor configured to:
capture, as a plurality of observation images, an image of each of a plurality of small areas,
wherein each of the plurality of small areas is a partition of a first area of a slide containing a sample; and
circuitry configured to:
set a first plurality of evaluation areas in a first observation image of the plurality of observation images;
set a second plurality of evaluation areas in a second observation image of the plurality of observation images;
detect an edge of each of the first plurality of evaluation areas and the second plurality of evaluation areas;
connect the plurality of observation images based on the partition to obtain a connected image,
wherein in the connected image, a first edge of a first evaluation area of the first plurality of evaluation areas is adjacent to a second edge of a second evaluation area of the second plurality of evaluation areas, and
wherein the first evaluation area and the second evaluation area are non-overlapped;

calculate, based on the first edge and the second edge, a difference in a blur evaluation amount between the first observation image and the second observation image;
determine a reimaging area of the plurality of small areas based on the difference; and
control the image sensor to capture the reimaging area.

11. The digital microscope system according to claim 1, wherein the first difference in the blur evaluation amount is an absolute value of a second difference in an edge density of the first evaluation area and the second evaluation area.

* * * * *